United States Patent
Neckermann et al.

(10) Patent No.: US 11,361,770 B2
(45) Date of Patent: Jun. 14, 2022

(54) DETECTING USER IDENTITY IN SHARED AUDIO SOURCE CONTEXTS

(71) Applicant: MICROSOFT TECHNOLOGY LICENSING, LLC, Redmond, WA (US)

(72) Inventors: Tom Neckermann, Seattle, WA (US); Alexander J. Wilson, Seattle, WA (US); Romain Gabriel Paul Rey, Vancouver (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 67 days.

(21) Appl. No.: 16/917,241

(22) Filed: Jun. 30, 2020

(65) Prior Publication Data
US 2021/0407520 A1  Dec. 30, 2021

(51) Int. Cl.
*G10L 15/02*   (2006.01)
*G10L 17/16*   (2013.01)
*G10L 17/04*   (2013.01)

(52) U.S. Cl.
CPC .............. *G10L 17/16* (2013.01); *G10L 15/02* (2013.01); *G10L 17/04* (2013.01)

(58) Field of Classification Search
CPC ......... G10L 17/16; G10L 17/04; G10L 15/02; H04N 7/15
USPC ........................................................ 704/249
See application file for complete search history.

(56) References Cited

U.S. PATENT DOCUMENTS

| | | | | |
|---|---|---|---|---|
| 8,463,600 | B2* | 6/2013 | Aoki | H04M 3/568 704/206 |
| 8,781,841 | B1* | 7/2014 | Wang | H04M 3/56 704/275 |
| 10,403,287 | B2* | 9/2019 | Dhoot | H04L 65/403 |
| 10,506,195 | B2* | 12/2019 | Faulkner | H04N 21/4316 |
| 10,740,704 | B2* | 8/2020 | Vangala | G06F 9/453 |
| 10,867,610 | B2* | 12/2020 | Diamant | H04N 7/15 |
| 11,057,233 | B1* | 7/2021 | D'Aniello | H04L 65/4038 |
| 11,127,232 | B2* | 9/2021 | Olshansky | G06Q 10/1053 |
| 11,140,102 | B1* | 10/2021 | Bax | G06N 20/00 |
| 2013/0024196 | A1 | 1/2013 | Ganong et al. | |
| 2013/0198635 | A1* | 8/2013 | Jones | H04M 3/563 715/727 |

(Continued)

OTHER PUBLICATIONS

"International Search Report and Written Opinion Issued in PCT Application No. PCT/US21/034669", dated Nov. 3, 2021, 16 Pages.

*Primary Examiner* — Susan I McFadden
(74) *Attorney, Agent, or Firm* — NovoTechIP International PLLC

(57) ABSTRACT

Computerized systems are provided for determining an identity of one or more users that use a same audio source, such as a microphone. The identity of one or more users that use a same audio source can based on generating a list of participant candidates who are likely to participate in an associated event, such as a meeting. For instance, embodiments can generate one or more network graphs of a meeting invitee any only voice input samples of the meeting invitee's N closest connections are compared to an utterance to determine the identity of the user associated with the utterance. One or more indicators that identify the users who are using the same audio source, as well as additional information or metadata associated with the identified user can be caused to be presented.

20 Claims, 11 Drawing Sheets

(56) References Cited

U.S. PATENT DOCUMENTS

2015/0110259 A1  4/2015  Thorington et al.
2018/0204576 A1  7/2018  Dhoot et al.

* cited by examiner

DETECTING USER IDENTITY IN SHARED AUDIO SOURCE CONTEXTS

BACKGROUND

Computer-implemented technologies can assist users in communicating with other users over communication networks, and in particular, allow audio exchange between each user in such communication networks. For example, some teleconferencing technologies use conference bridge components that communicatively connect multiple user devices over a communication network so that users can conduct meetings or otherwise speak with each other in near-real-time. In another example, meeting software applications can include instant messaging or chat functionality, audio-visual exchange functionality (e.g., via webcams and microphones), and allow files or other computer resources to be exchanged and stored in computer memory. However, these existing technologies and others do not provide functionality for intelligently determining an identity of users that use or share a same audio source (e.g., a microphone), among other things. Further, the stored information and the user interface functionality of these technologies are also limited for hearing impaired individuals, for example. Advances in computing technology and the increased prevalence of modern computing devices have resulted in a dramatic increase in data available regarding communication networks. But the conventional solutions have not kept pace with these advances and have failed to capitalize on the available data, or provide robust functionality in order to address these new challenges. Moreover, existing technologies unnecessarily consume computing resources, such as memory, CPU, and network resources, among other things.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of this disclosure relate to computerized systems for determining an identity of one or more users that use a same audio source (a "shared audio source"), such as a microphone. People may communicate with each other using video sharing technologies, teleconferencing technologies, meeting recording technologies, and the like. In certain situations, multiple users share a single audio source (e.g., a microphone or microphone array) such that any user wishing to speak must use the same audio source. For example, a group of users may be gathered together in a room, which includes a single microphone (or set of microphones). Each user must speak into the same microphone to communicate. As described herein, existing technologies lack the functionality to not only adequately identify a user of the single audio source that is shared among various users, but these technologies also lack the functionality to visually indicate such user (e.g., for hearing impaired users) when that user speaks, among other things.

Certain aspects of the present disclosure are directed to improving these technologies by determining an identity of one or more users that use a same audio source. For example, particular embodiments detect a first utterance (e.g., a natural language phrase) from an audio source at a meeting and a second utterance from the same audio source at the meeting. Responsively, the first and second utterances are input into a model (e.g., a Gaussian Mixture Model (GMM)) to determine that the two utterances did not come from the same user or that two different users made these utterances. Responsively, another model (e.g., a Hidden Markov Model (HMM)) can be used to attribute each voice utterance to a particular user to determine the identity of both users that made the utterances. In some embodiments, determining the identity of a specific user can include comparing the utterance to various historic voice input samples (e.g., past phone calls, past meeting audio streams, past smart speaker utterances) of specific users to determine if the utterance (or an indication of the utterance, such as a feature vector that represents the utterance) matches or is within a threshold similarity of the voice input samples. If the utterance is within a threshold similarity to a particular voice input sample, the tagged or associated classification (e.g., a user) is attributed to the utterance and vice versa.

Some embodiments determine the identity of one or more users that use a same audio source based on generating a list of participant candidates who are to participate in an associated event, such as a meeting. Some aspects generate this list of participant candidates using a user relationship object (e.g., a specific network graph). In various instances, only a portion of users that are closely connected to a user (e.g., are within a threshold distance from a user in the user's network graph) who was invited to an event are selected as participant candidates to participate in the event. In this way, certain embodiments include intelligent "pruning" by using selected information from these user relationship objects. In this way, instead of comparing an incoming utterance to voice input samples of each user in an organization (e.g., a business) to determine the identity of a user associated with the utterance, some of these embodiments that utilize user relationship objects only compare the utterance with those voice input samples of users that, for example, have N closest connections to the person associated with the detected utterance. This not only improves computing resource consumption but also improves the accuracy of voice recognition models, because the pool of potential speaking users that the utterance can be attributed to for determining an identity of users is vastly reduced, thereby reducing the likelihood of a model classification or prediction error.

Some embodiments cause presentation of one or more indicators that identify the users who are using the same audio source, as well as additional information or metadata associated with the identified user. For example, in response to determining the identity of a user based on attributing an utterance to the user, embodiments can cause presentation of an identifier that indicates the name and/or avatar of the user that is using a shared audio source (e.g., the name of the user and an indication that the user is inside of a particular conference room). Some embodiments cause display of other indicators that specify who is currently talking into the shared audio source. Some embodiments alternatively or additionally cause display of yet other indicators specifying the number of people using a shared audio source, and the like.

BRIEF DESCRIPTION OF THE DRAWINGS

Aspects of the disclosure are described in detail below with reference to the attached drawing figures, wherein.

DETAILED DESCRIPTION

Figure 1:
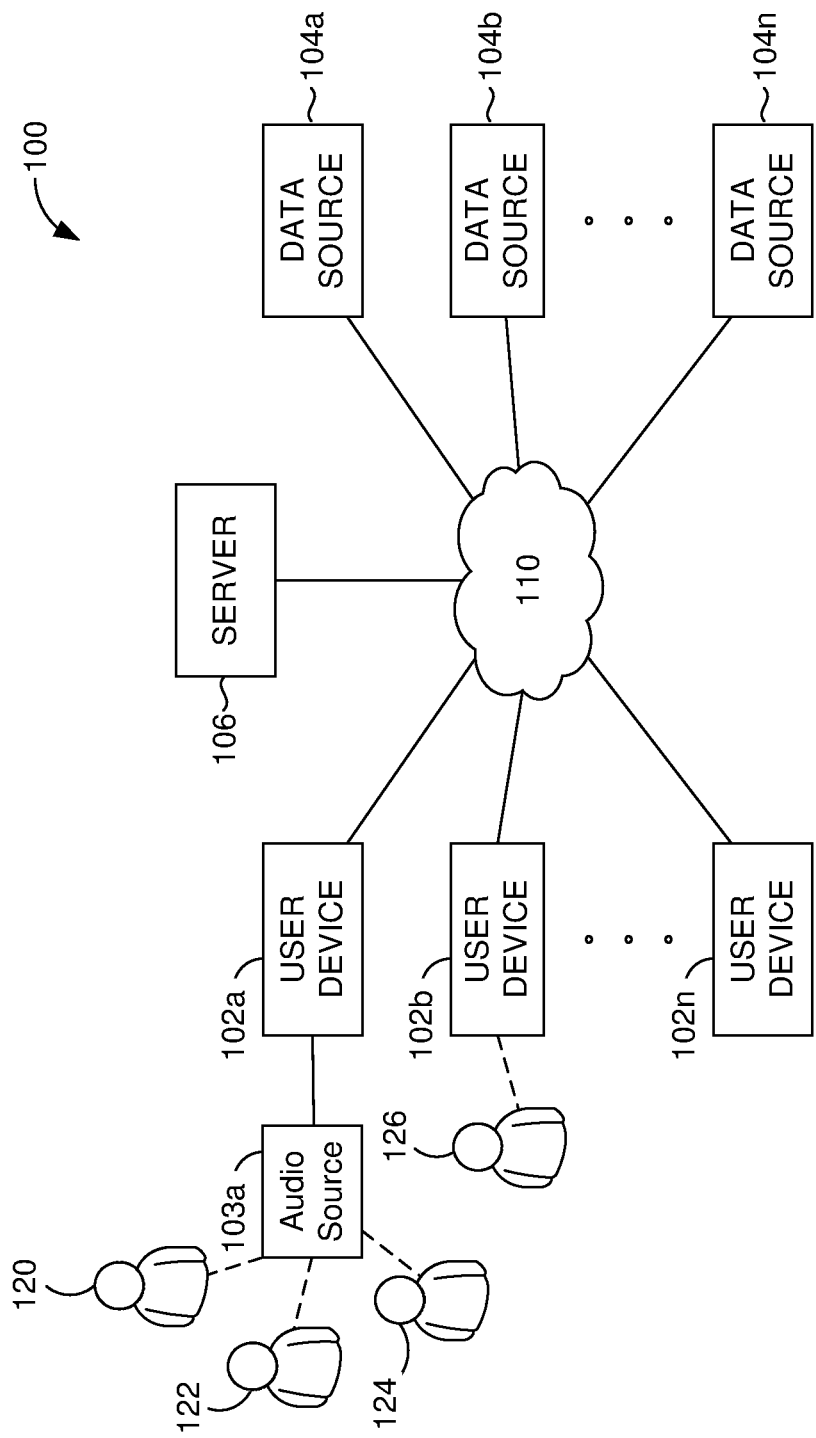
FIG. 1 is a block diagram of an exemplary computing environment suitable for use in implementing embodiments of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-useable instructions stored on computer storage media. The methods may be provided by a standalone application, a service or hosted service (standalone or in combination with another hosted service), or a plug-in to another product, to name a few.

Organizations, businesses, or other entities include individuals that are located across different geographical areas. Teleconferencing technologies or other collaboration tools (e.g., MICROSOFT TEAMS®) are an instrumental part of everyday communication among these individuals. For example, business units that include people living in different areas may use video sharing technologies, audio stream technologies with multiple speakers, and/or meeting recording technologies to communicate with each other for a meeting. In certain situations, multiple users (also referred to herein as "participants" or "attendees") of an event (e.g., a meeting) share a single audio source (e.g., a microphone or microphone array) such that any user wishing to speak must use the same audio source. For example, a group of users may be huddled around one user's computer in a conference room, which includes a single microphone. Accordingly, any time a user needs to speak, they must speak into the microphone. However, as described above, existing technologies lack the functionality to not only adequately identify a user of the single audio source that is shared among various users, but these technologies also lack the functionality to visually indicate such user (e.g., for hearing impaired users) when that user speaks, among other things.

Various aspects of the present disclosure make up these deficiencies and improve existing technologies by performing new functionality, as described herein. Certain aspects of the present disclosure are directed to determining an identity of one or more users that share a common audio source (e.g., a conference room's microphone) and causing presentation of one or more indicators that identify the one or more users or other users. For example, such indicators can include granular cues (e.g., multiple automatically generated avatars, portraits, names, or other indicators of each user sharing the audio source) that indicate who is currently speaking, the number of people sharing the same audio source, and/or the name of some or each of the people sharing the same audio source.

Figure 10:
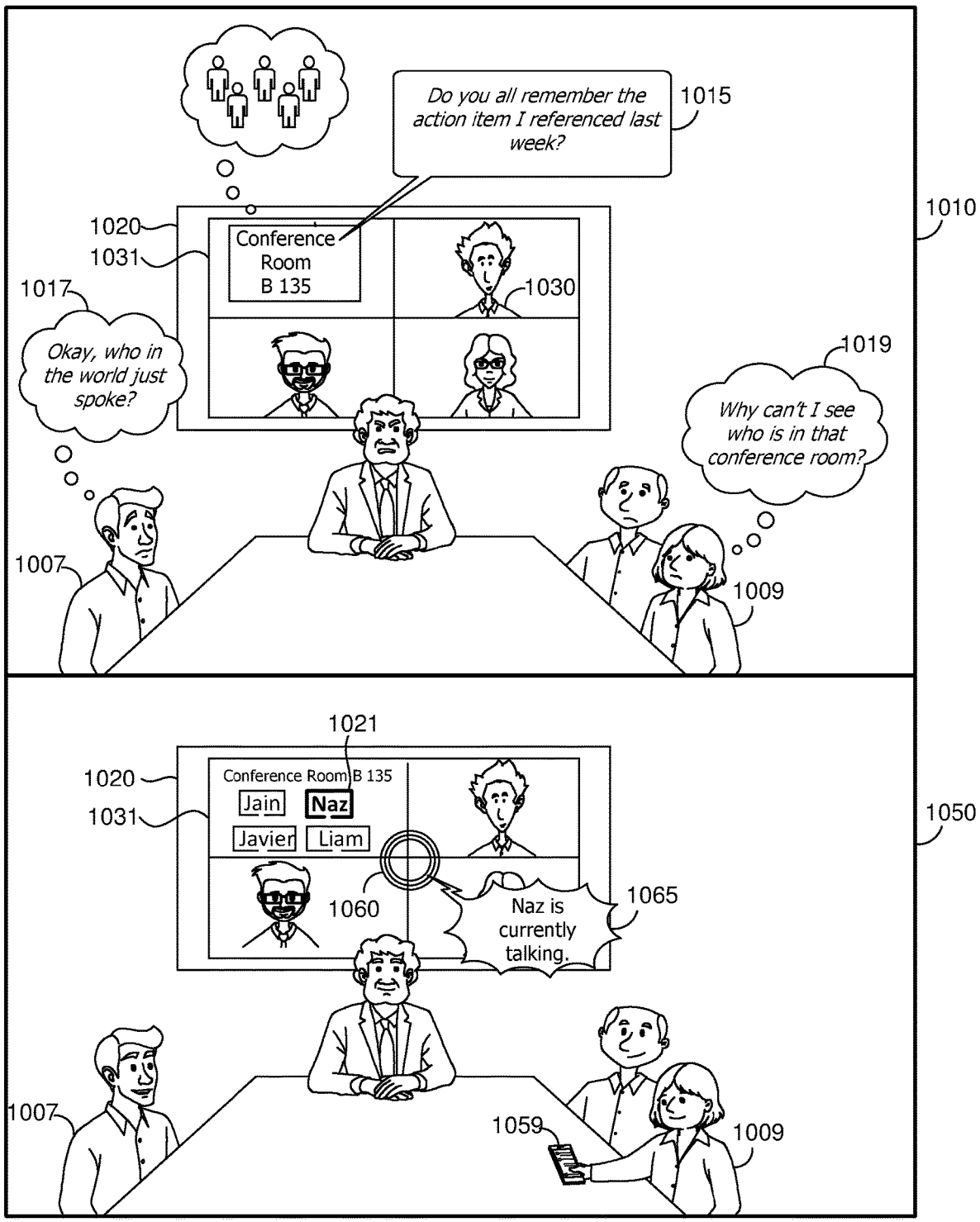
FIG. 10 illustratively depicts an example meeting event wherein an identity of each user that uses a shared audio source is determined and indicators that indicate the identity are displayed, in accordance with embodiments of the present disclosure.

At a high level, an illustrative example use case of one embodiment of the technology described herein is shown in FIG. 10. This example embodiment is utilized for determining an identity of each user that uses a shared audio source. In particular, FIG. 10 depicts two scenes 1010 and 1050 of a meeting. The meeting includes meeting attendees physically present at the meeting (e.g., attendees 1007 and 1009) and meeting attendees attending online (e.g., attendee 1030), which are displayed on a computer display 1020. In the first scene 1010, one of multiple participants gathered in the conference room B 135 (and that use a same audio source), indicated as 1031 on computer display 1029, is shown asking, at statement 1015, whether anybody remembers an action item that was discussed in a previous week. In response to this statement by the participant in the conference room B 135 (indicated as window 1031), other meeting attendees in scene 1010 appear worried because they do not know who made the statement and why no picture or other indicator on window 1031 of the screen 1020 shows who is participating in the conference room B 135. For instance, attendee 1007 is shown thinking in thought-bubble 1017, "Okay, who in the world just spoke?" and attendee 1009 (e.g., a hearing impaired individual) is shown thinking in thought-bubble 1019, "Why can't I see who is in that conference room?"

Ordinarily, these participants could be in trouble and even may be at risk for losing their job if they could not determine the identity of individuals because they can, for example, miss important action items. The attendees 1007 and 1009 may have some familiarity with voices of those participants in the conference room B 135 or may otherwise try to guess who is speaking, but it is often difficult or impossible to determine all users that share the same audio source. Using conventional meeting-recording, teleconferencing, or other technologies, attendees 1007 and 1009 might be able to identify meeting participant 1030 based on direct video feedback of his image as illustrated in window 1031 of the computer display 1020 of scene 1010. Additionally, these attendees might identify names of participants by their corresponding avatars based on technologies that map, via a data structure, specific devices to identities of specific users. But as further described herein, this same functionality is difficult if not impossible to map devices to identities of users when there are multiple users that use a same device or share the same audio source. Moreover, video sharing is often disabled for many (if not all) participants. Video sharing shows all participants and makes it possible to identify the currently active speaker or participants, but this cannot happen when it is disabled or there are many participants in a conference room or otherwise share a same audio source.

Turning now to scene 1050 of FIG. 10, aspects of the example embodiment are depicted. In particular, this particular example embodiment is implemented using a virtual assistant, such as the Cortana® assistant by Microsoft® Corporation, operating in connection with a meeting or communications application, such as Microsoft Teams®. As shown in scene 1050, computer display 1020 shows window 1031 depicting a new representation of the conference room B 135. Instead of merely indicating that a particular conference room B 135 or group of users are participating in the meeting, as illustrated in scene 1010, window 1031 of the computer display 1020 depicts the identity of multiple participants that are sharing a same audio source or are in the conference room B 135. The computer display 1020 also depicts a virtual assistant 1060, such as the Cortana virtual assistant. The virtual assistant 1060 has automatically determined an identity of each participant within the conference room B 135 and/or determined who is currently speaking, as described in more detail herein. Virtual assistant 1060 then states, at statement 1065, "Naz is currently talking." Alternatively, or in addition to the statement, window 1031 of display 1020 may display an indication of the current speaker, such as the highlighted box 1021 indicating that Naz is currently speaking. Although the particular example in scene 1050 uses a virtual assistant 1060, other embodiments, as described herein, may be carried out using computerized system(s) or methods that do not utilize a virtual assistant service. These embodiments can similarly perform identification of a current speaker from among a plurality of co-located speakers, such as the attendees in conference room B 135, and can provide a similar visual or audio indication, as shown in scene 1050, to enable other users to know who is currently speaking.

Continuing with the above example, in response to statement 1065 and/or information provided to the computer display 1020, meeting attendees (e.g., attendees 1007 and 1009) appear relieved and less worried because they know who is speaking, who is in the conference room B 135, and potentially what action item was referenced last week based on the identity of the currently speaking user. Additionally, attendee 1009 (e.g., a hearing impaired individual) is holding a user device 1059, which displays a structured transcript report of the meeting, including who has spoken or is speaking even when an audio source is a shared audio source. In this way and as further described below, embodiments of the technologies described herein improve upon conventional event-related technologies. In some embodiments, the user device 1059 (and/or the computer display 1020) additionally or alternatively displays other contextual information, such as the number of people in the conference room B 135, a visual indicator, such as highlighted box 1021, indicating who is currently speaking even when the audio source is shared, and/or a visual indicator that identifies individuals within the conference room B 135 similar to window 1031 of the computer display 1020 in scene 1050.

In some embodiments, in order to help hearing impaired users, the user device 1059 (and/or the computer display 1020) additionally or alternatively displays a real-time speech-to-text transcription labelled by name. For example "[Nita Lopez] 'how are you all doing'" and "[Igor Larionov] 'I'm doing great'" rather than just "how are you all doing" and "I'm doing great." Some embodiments alternatively or additionally assist a person with visual impairment by causing detected names (e.g., names within the conference room B 135) to be encoded into an audio stream (e.g., via text-to-speech functionality), which would be helpful if they are unable to see the names on the screen of who is speaking or who is using a shared audio source. In this way, particular embodiments output an audio sequence that associates names to various utterances and/or shared audio sources so that names can be heard alternative to or in addition to being viewed. One example of this functionality is described with respect to the voice assistant 1060 uttering the statement 106 but the voice assistant 1060 can alternatively or additionally utter each name in the conference room B 135 as illustrated in the computer screen 1020 without detecting any utterances.

As described herein (e.g., with respect to scene 1010 of FIG. 10), various video, teleconferencing, virtual assistant, and assistive technologies lack the capability to intelligently determine the identity of users and cause presentation of indicators of users when those users share a same audio source. Various embodiments of the present disclosure improve these technologies by determining identities of users who use a same audio source(s) and may cause presentation of an indicator that identifies those users (e.g., as illustrated by highlighted box 1021 on the computer display 1020 of scene 1050). Some embodiments make this improvement by detecting a shared audio source at an event (e.g., a meeting, a telephone call, a chat session, and the like). A "shared audio source" as described herein refers to an audio source where two or more different sound utterances (e.g., natural language phrases or sounds) indicative of two or more different people have been detected. Additionally or alternatively, a shared audio source refers to an indication of an audio source that has been assigned (e.g., via mapping data structure) to two or more different users (e.g., based on contextual information) because the two or more different users are to share or otherwise use the same audio source. For example, some embodiments can analyze an email (or similar communication), a calendar, meeting invite, sensors, or other computer resource indicating that a business unit of users will use a conference room for an upcoming meeting. Accordingly, some embodiments can infer that there will be a shared audio source utilized at the meeting. Therefore, a shared audio source may be indicative of a plurality of participants of an event (e.g., a meeting) using (e.g., speaking into) the same audio source or who will use the same audio source at some future time.

An "audio source" or electronic audio source, as described herein may include or be associated with a component or module that is configured to electrically receive or pick up sound waves. For example, an audio source may include a module or hardware-based transducer (or set of transducers), such typically found in a microphone, that is configured to convert sound waves (e.g., utterances) into electric energy (e.g., audio signals). Audio sources can be internal or external audio sources. An "internal" audio source is one that is built or located within a device (e.g., a laptop user device). An "external" audio source is one that is standalone or located outside of a device such that it can be communicatively coupled as an I/O device (e.g., via a connector that fits into a port of a device, thereby connecting the device and the microphone via a wire). In an illustrative example, an audio source may be or include: a microphone, a series of microphones, a smart speaker, a set of smart speakers, and the like.

In some embodiments, a shared audio source is detected based on determining (e.g., in near-real-time) that different utterances coming from a same audio source are associated with two or more different users. An "utterance" as described herein refers to a spoken natural language word, a natural language phrase, a natural language sentence, and/or any natural language sound. In an illustrative example of detecting a shared audio source, particular embodiments detect a first utterance from an audio source at a meeting and a second utterance from the same audio source at the meeting. Responsively, the first and second utterances may be input into a model (e.g., a Gaussian Mixture Model (GMM)) to determine that the two utterances did not emanate from the same user or that two different users made these utterances, as described in more detail herein. Accordingly, because utterances detected from two or more different users are mapped to the same audio source, it can be inferred that an audio source is a shard audio source.

Additionally or alternatively, the detecting of the shared audio source is based on analyzing contextual data. "Contextual data" as described to herein refers to any information known about the identity of users who are to share a same audio source. In some embodiments, contextual data refers to any information received outside of an event and not during the event itself. For example, contextual data can be data retrieved from a user device (e.g., via a calendaring or scheduling application or tool plug-in, text, social media, or other application), sensor (e.g., biometric sensor, geolocation sensor), one or more servers, and/or other remote data stores, such as a database that indicates a specific identity of all or some users that will share a particular audio source at an event. In an illustrative example, before a meeting starts, certain embodiments can obtain contextual data from sources outside of a teleconferencing communication application, such as a communication (e.g., an email or meeting invite), which identifies the names of one or more users that will be present in a meeting location, such as a particular conference room. Accordingly, embodiments can analyze this communication to infer that those users may share a same microphone and therefore detect a likely shared audio source. In some embodiments, however, contextual data additionally or alternatively refers to any information that is a part of an event or is received/analyzed during the event. For example, contextual data can be utterances in a meeting that indicate an identity of users that will share an audio source or computer resources (e.g., files) that are shared in the meeting, which identify the users who will share an audio source. In an illustrative example, at the beginning of a meeting, a participant may state that she has a group of individuals with her in a conference room. Accordingly, embodiments can analyze this statement that detect a shared audio source based on this statement.

In some embodiments, an intelligent graphical user interface may be provided that includes functionality to improve the user experience and user interface technologies. Existing user interface or display technologies are particularly deficient in terms of their functionality. Conventional technologies, such as chatrooms or user interfaces of meeting applications simply display a single avatar or other identifier that is too broad to identify specific users of a shared audio source. For example, referring to FIG. 10 and the computer display 1020 of scene 1010, only the identifier "conference room B 135" is displayed. This forces the tedious user-performed task of manually scrolling or drilling down through communication threads, windows, pages and the like to guess which users may be in the conference room location and thus sharing the single audio source. For example, the user may try to manually guess who is in a conference room by trying to decipher or recognize voices based on past chat sessions or experiences. This can cause inaccuracies because of human error and the extensive time needed to make this determination. Additionally, conventional automatic transcription (e.g. speech-to-text) services will be unable to distinguish and identify the different speakers at the conference room location.

Various embodiments of the present disclosure improve these conventional technologies because they can, for example, cause display of a condensed list or container of indicators that identify participants who use a shared audio source and other information (e.g., who is currently speaking, number of users in a conference room, and the like) via a single user interface. In this way, embodiments provide a type of summary without requiring users to drill down, scroll, or otherwise sort through a lot of data within chat histories or other data to look for this information or try to manually guess who is speaking. For example, referring to FIG. 10, embodiments can provide an interface similar to window 1031 of the computer display 1020 of scene 1050, or similar to the screenshot 700 of FIG. 7, as described herein. Similarly, because these embodiments can distinguish the specific speaking users sharing an audio source, improved automatic transcription services may be provided that can identify, in a transcript generated by these services, the specific speaking users of the shared audio source and their corresponding transcribed utterances.

These user interfaces can be particularly helpful for people, such as hearing impaired users. Existing technologies do not offer any insight or indication as to who users are, especially when they use a shared audio source. For example, although existing speech-to-text technologies can convert auditory sound signals to written natural language text, these technologies have no way of associating or attributing such written natural language text to users when those users use a shared audio source. Moreover, existing meeting applications provide generic avatars as indicated in the scene 1010. Accordingly, users, especially hearing impaired users, have no way of knowing who has spoken or will speak when an audio source is a shared audio source.

Existing technologies are inefficient in terms of computing resource consumption (e.g., CPU, memory, I/O, network latency). Existing technologies require entire training or other data sets to be transmitted over a network, processed, or stored in memory. For example, in order to perform voice recognition functionality, some technologies compare an incoming or real-time utterance to historical voice profiles (e.g., recorded telephone conversations) of each user in a company in order to determine whether the incoming utterance matches a particular user's voice. This can increase storage device I/O (e.g., excess physical read/write head movements on non-volatile disk) or network latency because when a different voice profile is analyzed and there are many different voice profiles, requests have to repetitively reach out to the storage device to perform read/write operations, which is time consuming, error prone, and can eventually wear on components, such as a read/write head. Additionally, CPU overhead is increased and throughput is decreased based on using handles or pointers to locate each voice profile in memory for each user, which is expensive when there are multiple voice profiles of users to locate. Further, existing technologies issue repetitive queries to obtain speech profiles of each user but this is computationally expensive, especially when there are a vast amount of users. For example, an optimizer engine of a database manager module calculates a query execution plan (e.g., calculates cardinality, selectivity, etc.) each time a query is issued, which requires a database manager to find the least expensive query execution plan to fully execute the query. Most database relations, such as tables, contain hundreds if not thousands of records. Repetitively calculating query execution plans to obtain each speech profile, especially when there are many users, decreases throughput and increases network latency.

Various embodiments of the present disclosure improve these technologies by improving computing resource consumption of computing devices. For example, some aspects determine an identity of users that use a shared audio source based at least in part on generating a list of participant candidates using a user relationship object (e.g., a specific network graph). A "participant candidate" as described herein is a participant that is a candidate for being included in an event, such as a meeting. A "user relationship object" as described herein refers to or includes computer object(s), data structure(s), function(s), method(s), and/or value(s) in memory referenced by an identifier that indicates relationships between various users and/or various computer resource(s) (e.g., a file, a document, a social media post, and the like) associated with such users. For example, the user relationship object can be or represent a network graph, where the vertices represent multiple users and/or computer resources that the users interact with and the edges represent specific user interactions (e.g., file downloads).

In some embodiments, only a portion of users that are closely connected to a user (e.g., are within a threshold distance from a user in the user's network graph) who was invited to an event are selected as participant candidates to participate in the event. In this way, embodiments include intelligent "pruning" by using selected information from these user relationship objects. This limits the number of potential voice profiles of users that each runtime utterance is mapped to. Instead of comparing an incoming or real-time utterance to historical voice profiles of each user in a company, as described above, some of these embodiments that utilize user relationship objects only compare an utterance with those historical voice profiles of users that, for example, have N closest connections to the person associated with the detected utterance. This reduces storage device I/O (e.g., excess physical read/write head movements on non-volatile disk) or network latency because this pruning allows fewer voice profiles to be analyzed, so requests do not have to repetitively reach out to the storage device to perform read/write operations. Additionally, CPU overhead is decreased and throughput is increased because fewer user profiles have to be located in memory. Further, fewer queries are needed to obtain voice profiles of each user. In this way, when an optimizer engine of a database manager module calculates a query execution plan (e.g., calculates cardinality, selectivity, etc.), the database manager only has to find the least expensive query execution plan for fewer voice profiles, which increases throughput and decreases network latency.

Some embodiments reduce memory storage consumption by deleting the amount of voice training data to analyze. Data privacy is a concern for many individuals and entities. Accordingly, one way to deal with data privacy is to discard voice data based on one or more rules (e.g., deleting a particular quantity of data after every Nth time period). This also reduces memory consumption and frees up other system resources, such as CPU, since less data has to be analyzed.

Various embodiments improve the accuracy of existing machine learning models (e.g., Hidden Markov Models) by generating a list of participant candidates, which is at least partially used to determine an identity of a user that uses a shared audio source. In some embodiments, the determination of an identity of a user is based at least in part on detecting a particular utterance and performing particular voice recognition functionality. For example, some embodiments learn, via machine learning training, users' voices (e.g., using a Hidden Markov Model (HMM)) based on past calls or other historic voice profiles (also referred to herein as "voice input samples") from the users. Accordingly, when a runtime or incoming utterance is received at an event, the previously trained model(s) can be used to map the utterance to a specific user identity, which is described in more detail herein. In some embodiments, some of the inputs to these models include data that is not a payload or direct utterance data itself (e.g., frequency values, amplitude values, and wavelength values for a set of phenomes). Rather, the inputs can include information derived from a user relationship object or other information that allows participant candidates to be generated. As described above, this limits the number of users each utterance is mapped to. For example, if a business unit is invited to a remote meeting, it is likely that the participants will only include members of the business unit. In other words, certain embodiments do not have to compare voice profiles to the trained models of every user in an entire company. Rather, embodiments can achieve improved accuracy by only considering participant candidates who are invited to the meeting (or closely associated to the invitees) as determined by a user relationship object. Put another way, the accuracy of voice or user recognition is improved, as the pool of potential speaking users that the utterance can be mapped to is vastly reduced, thereby reducing the likelihood of a model classification or prediction error.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; audio source 103a; and network 110. It should be understood that environment 100 shown in FIG. 1 is an example of one suitable operating environment. Each of the components shown in FIG. 1 may be implemented via any type of computing device, such as computing device 1100 described in connection to FIG. 11, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 11 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, smart glasses, microphone enclosure or housing, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2. (For instance, in one embodiment, one or more data sources 104a through 104n provide (or make available for accessing) user data to user-data collection component 210 of FIG. 2.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors (not shown) which may be integrated into or associated with one or more of the user device(s) 102a, 102b, or 102n or server 106. Examples of sensed user data made available by data sources 104a through 104n are described further in connection to user-data collection component 210 of FIG. 2.

Operating environment 100 includes an audio source 103A, which is a shared audio source. Accordingly, for example, each of the users 120, 122, and 124 are located in the same room or otherwise use the same audio source 103a to speak into. In response to the audio source 103a receiving an utterance (auditory sound information) or converting the utterance of one of the users (120, 122, or 124) to electrical signals, the audio source 103a or user device 102a transmits, over the network 110, the auditory sound information to the server 106. The server 106 may responsively determine an identity of one of the users (120, 122, or 124) based at least in part on detecting or analyzing the utterance, as described in more detail herein. As illustrated in FIG. 1, the operating environment 100 also includes the user device 102b, which is associated with only a single user 126. In these embodiments, the user device 102b may include or represent a single audio source and not a shared audio source. That is, only an identity of the user 126 is detected from the audio source (and no other users are detected) and/or the user 126 is the only user assigned to an audio source associated with the user device 122b.

Figure 2:
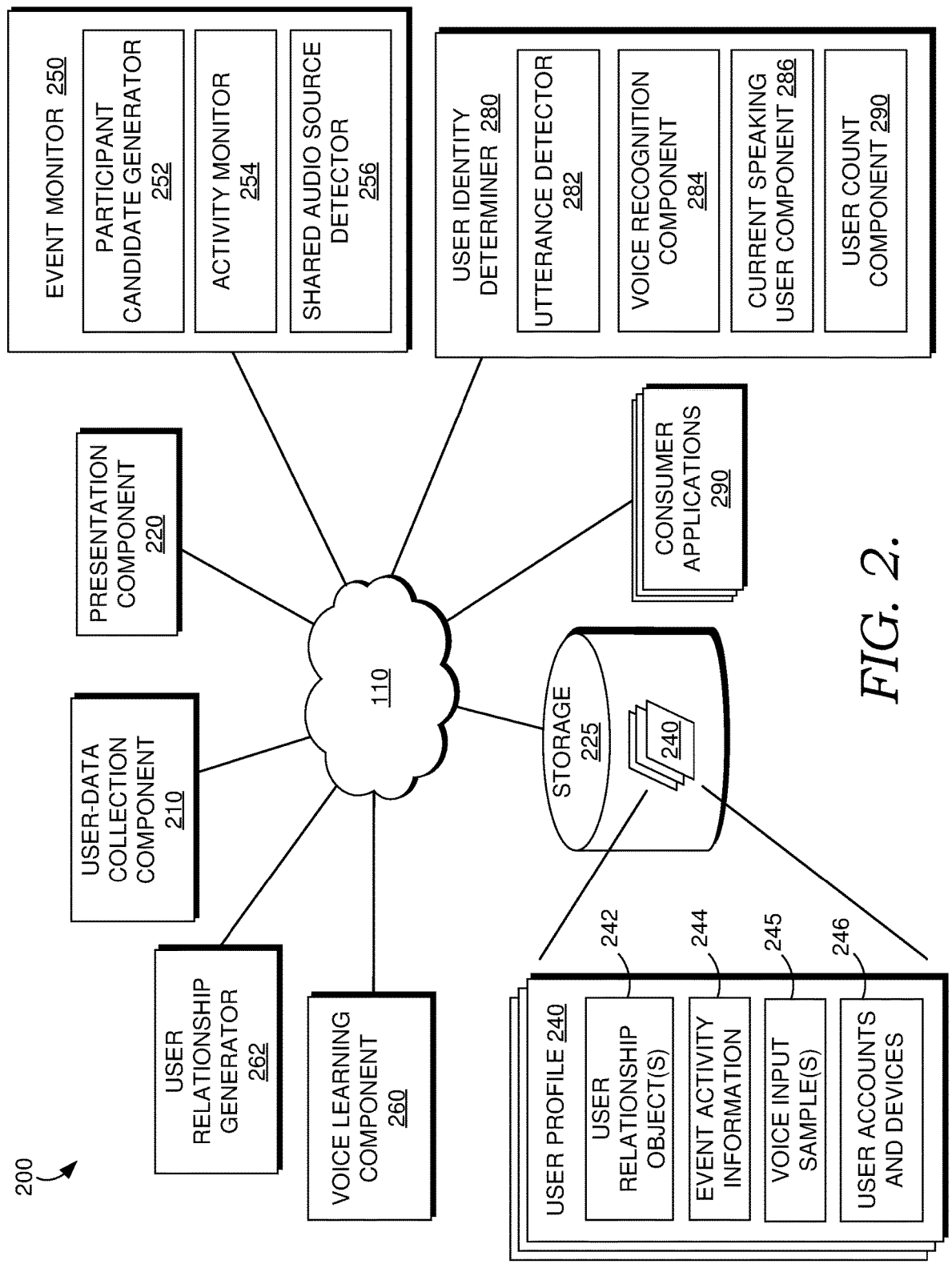
FIG. 2 is a block diagram illustrating an example system architecture for determining an identity of one or more users of a shared audio source and causing presentation of one or more unique identifiers, in accordance with embodiments of the present disclosure.

Operating environment 100 can be utilized to implement one or more of the components of the system 200, described in FIG. 2, including components for generating or updating composite views or data objects. Operating environment 100 also can be utilized for implementing aspects of process flow 800, and/or 900 as described with respect to FIGS. 8 and 9 respectively. Referring now to FIG. 2, with FIG. 1, a block diagram is provided showing aspects of an example computing system architecture suitable for implementing an embodiment of the disclosure and designated generally as system 200. The system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including the user profile 240, voice learning component 260, user relationship generator 262, user-data collection component 210, presentation component 220, event monitor 250, user identity determiner 280, consumer application(s), and storage 225. The system 200 is generally responsible for determining an identity of one or more users of a shared audio source and causing presentation of one or more unique identifiers. In some embodiments system 200 may include or operate with one or more consumer applications 290. These components may be embodied as a set of compiled computer instructions or functions, program modules, computer software services, or an arrangement of processes carried out on one or more computer systems, such as computing device 1100 described in connection to FIG. 11 for example.

In some embodiments, the functions performed by components of system 200 are associated with one or more personal assistant applications, services, plugins, extensions, or routines. In particular, such applications, services, plugins, extensions, or routines may operate on one or more user devices (such as user device 102*a*), servers (such as server 106), may be distributed across one or more user devices and servers, or be implemented in the cloud. Moreover, in some embodiments, these components of system 200 may be distributed across a network, including one or more servers (such as server 106) and client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2, user-data collection component 210 is generally responsible for accessing or receiving (and in some cases also identifying) user data (e.g., voice input samples) from one or more data sources, such as data sources 104*a* and 104*b* through 104*n* of FIG. 1. In some embodiments, user-data collection component 210 may be employed to facilitate the accumulation of user data of a particular user or group (or in some cases, a plurality of users including crowdsourced data) for the voice learning component 260, the event monitor 250 and/or the user profile 240. The data may be received (or accessed), and optionally accumulated, reforLarsed, and/or combined, by user-data collection component 210 and stored in one or more data stores such as storage 225, where it may be available to other components of system 200. For example, the user data may be stored in or associated with the user profile 240, as described herein. In some embodiments, any personally identifying data (i.e., user data that specifically identifies particular users) is either not uploaded or otherwise provided from the one or more data sources with user data, is not permanently stored, and/or is not made available to the components or subcomponents of system 200. In some embodiments, a user may opt into or out of services provided by the technologies described herein and/or select which user data and/or which sources of user data are to be utilized by these technologies.

User data may be received from a variety of sources where the data may be available in a variety of formats. For example, in some embodiments, user data received via user-data collection component 210 may be determined via one or more sensors, which may be on or associated with one or more user devices (such as user device 102*a*), servers (such as server 106), and/or other computing devices. As used herein, a sensor may include a function, routine, component, or combination thereof for sensing, detecting, or otherwise obtaining information such as user data from a data source 104*a*, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech or voice recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

User data can be received by user-data collection component 210 from one or more sensors and/or computing devices associated with a user. While it is contemplated that the user data may be processed, for example by the sensors or other components not shown, for interpretability by user-data collection component 210, embodiments described herein do not limit the user data to processed data and may include raw data. In some embodiments, user-data collection component 210 or other components of system 200 may determine interpretive data from received user data. Interpretive data corresponds to data utilized by the components of system 200 to interpret user data. For example, interpretive data can be used to provide context to user data, which can support determinations or inferences made by the components or subcomponents of system 200, such as venue information from a location, a text corpus from user speech (i.e., speech-to-text), or aspects of spoken natural language understanding. Moreover, it is contemplated that for some embodiments, the components or subcomponents of system 200 may use user data and/or user data in combination with interpretive data for carrying out the objectives of the subcomponents described herein.

In some respects, user data may be provided in user-data streams or signals. A "user signal" can be a feed or stream of user data from a corresponding data source. For instance, a user signal (e.g., a voice input sample) could be from a smartphone, a home-sensor device, a smart speaker, a GPS device (e.g., for location coordinates), a vehicle-sensor device, a wearable device, a user device, a gyroscope sensor, an accelerometer sensor, a calendar service, an email account, a credit card account, or other data source. In some embodiments, user-data collection component 210 receives or accesses user-related data continuously, periodically, as it becomes available, or as needed. In an illustrative example of how the user-data collection component 210 works, this component may receive and record telephone calls, smart speaker utterances, video conference sessions, or any other voice input samples from a user to train on these samples, as described in more detail herein.

Example system 200 includes the user relationship generator 262. The user relationship generator 262 is generally responsible for generating one or more user relationship object(s) 242 for one or more users. In some embodiments, these user relationship object(s) 242 are generated based at least in part on information obtained from the user-data collection component 210. For example, the user relationship generator 262 can build a user relationship object for a user based on other users and/or computer resources mentioned in an email, text, social media post, meeting application, and the like. In an illustrative example of the user relationship generator 262 functionality, this component can build a network graph (e.g., a MICROSOFT graph) for each user in an organization or other entity. Such network graph can map each user's relationship to other entities (e.g., users, files, emails, and/or the like). For example, when two users edit the same file, they are linked to each other in the graph through file interaction. The more interactions users have with other entities, the greater number of connections are generated between those users in the graph. These user relationship object(s) 242 can alternatively or additionally be any suitable objects that map users to other users/entities or otherwise shows relationships. For example, the user relationship object(s) 242 can be a hash map, key-value store, or other data structure that maps a user to one or more other users and/or computer resources. For example, a key may be a first user, and a value set may be some or all the team members that is in the user's team or people that have been invited to a particular meeting. As described in more detail herein, some embodiments use these user relationship object(s) 242 to help the user identity determiner 280 determine an identity of one or more users that will or have spoken.

The user profile 240 includes information about a specific user, such as user relationship object(s) 242, event activity information 244, voice input sample(s) 245, and user accounts and devices 246 of the user. In some embodiments, the user profile 240 is indicative of a data structure or object that is populated with information collected from the user data collection component 210. The user profile 240 includes event activity information 242. This may include metadata or other information about one or more particular events (e.g., an upcoming event that has not taken place of a history of events that have already taken place). An "event" as described herein refers to any real world or virtual occurrence that one or more persons can be a part of or participate in. For example, an event can be an in-person or virtual meeting, a chat session, a conference call, a telephone call, and the like. Event activity information 242, for example, can include the name of an upcoming meeting, an identity of the attendees who have been invited to the meeting, the topic(s) to be discussed during the meeting, the agenda for the meeting, the planned duration of the meeting, and the like.

The voice input sample(s) 245 generally refers to a voice profile or footprint of one or more voice samples of a specific user. Voice input sample(s) 245 can refer to a particular time window or time sequence of recorded phonemes, words, sentences, and/or other utterances of a user. For example, the voice input sample(s) 245 can include multiple historical telephone conversations that a user has engaged in. These voice input sample(s) 245 may be used to train the voice learning component 260, as described in more detail herein.

The user accounts and devices 246 is generally responsible for storing information concerning membership or account information (e.g., passphrases) of the user and one or more devices (or audio sources) that a user uses or owns. For example, the user accounts and devices 246 can include a data structure that maps each user to a user device ID, which can be used to at least partially identify a user, as described in more detail herein with reference to the user identity determiner 280.

Continuing with FIG. 2, example system 200 includes the voice learning component 260. The voice learning component 260 is generally responsible for using one or more models 235 (e.g., Hidden Markov Models (HMM), Long Short Term Memory (LSTM) models, and the like) to learn voice patterns of one or more users. For example, the voice learning component 260 can determine a pattern in the amplitude, frequency, and/or wavelength values for particular tones of one or more voice utterances (e.g., phenomes) that a user has made. In some embodiments, the inputs used by these one or more models include voice input samples, as collected by the user-data collection component 210. For example, the one or more models can receive historical telephone calls, smart speaker utterances, video conference auditory data, and/or any sample of a particular user's voice. In various instances, these voice input samples are pre-labeled or classified as the particular user's voice before training in supervised machine learning contexts. In this way, certain weights associated with certain features of the user's voice can be learned and associated with a user, as described in more detail herein. In some embodiments, these voice input samples are not labeled and are clustered or otherwise predicted in non-supervised contexts.

In some embodiments, the voice learning component 260 uses an HMM to train on the voice input samples. An HMM is a computing tool for representing probability distributions (e.g., the probability that voice input sample segments belong to the same class, such as a user) over sequences of observations (e.g., different voice input samples or portions of a single voice input sample). These tools model time series data. For example, at a first time window, a user may utter a first set of phenomes at a particular pitch and volume level, which are recorded as particular amplitude values, frequency values, and/or wavelength values. "Pitch" as described herein refers to sound frequency (e.g., in Hertz) indicative of whether a voice is a deep or low voice or high voice. A "phenome" is the smallest element of sound that distinguishes one word (or word element, such as a syllable)

from another. At a second time window subsequent the first time window, the user may utter another set of phenomes that have another set of sound values.

HMMs augment the Markov chain. The Markov chain is a model that provides insight about the probabilities of sequences of random variables, or states, each of which take on values from a set of data. The assumption with Markov chains is that any prediction is based only on the current state, as opposed to states before the current state. States before the current state have no impact on the future state. HMMs can be useful for analyzing voice data because voice phenomes of pitch, tones, or any utterances tend to fluctuate (e.g., depending on mood or the goal) and do not necessarily depend on prior utterances before a current state (e.g., a current window of 10 seconds of a single voice input sample). In various cases, events of interest or features are hidden in that they cannot be observed directly. For example, events of interest that are hidden can be the identity of the users that make utterances or are associated with voice input samples. Although an utterance or voice input data (e.g., frequency, amplitude, and wavelength values) are directly observed, the identity of the users who made the utterances or voice input samples is not known (i.e., is hidden).

An HMM allows the model to use both observed events (e.g., a voice input sample) and hidden events (e.g., an identity of various users) that are essentially causal factors in a probability algorithm. An HMM is represented by the following components: a set of N states $Q=q_1 q_2 \ldots q_N$, a transition probability matrix $AA=a_{11} \ldots a_{ij} \ldots a_{NN}$, each $a_{ij}$ representing the probability of moving from state i to state j, s.t. $\Sigma_{j=1}^{N} a_{ij}=1 \forall i$, a sequence of T observations $O=o_1 o_2 \ldots o_T$, each one drawn from a vocabulary $V=v_1, v_2, \ldots v_T$, a sequence of observation likelihoods $B=b_i(o_t)$, also called emission probabilities, each expressing the probability of an observation $o_t$ being generated from a state i and an initial probability distribution $\pi=\pi_1 \pi_2 \ldots \pi_N$ over states. $\pi_i$ is the probability that the Markov chain will start in state i. Some states j may have $\pi_j=0$, meaning that they cannot be initial states.

The probability of a particular state (e.g., an identity of a user that uttered a first phenome sequence)) depends only on the previous state (e.g., an identity of a user that issued another particular phenome sequence prior to the first phenome sequence), thus introducing the Markov Assumption: $P(q_i|q_1 \ldots q_{i-1})=P(q_i|q_{i-1})$. The probability of an output observation $o_i$ depends only on the state that produced the observation $q_i$ and not on any other states or any other observations, thus leading to output independence $O(o_i|q_1 \ldots q_i \ldots, q_T, o_1, \ldots, o_i, \ldots o_T)=P(o_i|q_i)$. This allows a component to state that given observations o (e.g., a first sub-portion of a voice input sample of a set of voice frequency values), the algorithm can find the hidden sequence of Q states (e.g., the identity of one or more users that issued each segment of each voice input sample).

In various embodiments, a HMM or other model is provided for each user (e.g., of an organization) to train on their everyday calls or other voice samples in order to "learn" their particular voices (e.g., by learning the hidden variables of an HMM). Some embodiments re-train the voice model after every new call (or voice input sample ingested), which enables embodiments to continuously improve the user's voice model. Some embodiments alternatively or additionally use other models, such as LSTMs and/or GMMs, which are each described in more detail herein.

Continuing with FIG. 2, example system 200 includes event monitor 250. The event monitor 250 includes the participant candidate generator 252, the activity monitor 254, and the shared audio source detector 256. Event monitor 250 is generally responsible for determining or detecting online (e.g., virtual) and/or in-person events (e.g., a teleconference meeting) and features from the events that have occurred or will occur. For instance, the event monitor 250 can receive an indication that a computerized group container has been formed. A "computerized group container" as described herein is a container that is configured to store one or more electronic messages exchanged between a plurality of participants of a group. Many cloud scale services are built on top of data layers which scale horizontally by spreading data across management units, known as shards. Each management unit controls a subset of a total data corpus. When a group is formed, a group shard is created corresponding to the computerized group container or communication group. For example, a computerized group container or communication group may be a MICROSOFT TEAMS® channel or group, a MICROSOFT SHAREPOINT® group, a MICROSOFT YAMMER® group, a social network of friends or acquaintances (e.g., FACEBOOK), a chat group, or any suitable container where users can share and access messages, threads, and/or posts. Accordingly, the event monitor 250 can receive an indication that a meeting of computerized group container has been set based on a user request to create such meeting.

In some embodiments, the input into the event monitor 250 is sensor data, user device data of one or more users engaging in an event and/or contextual data from a meeting invite, email, chat for the group, or any historic messages sent within the group. In some embodiments, this includes user data collected by the user-data collection component 210 (which can be accessible via the user profile 240).

The participant candidate generator 252 is generally responsible for generating a list of participant candidates associated with an event (e.g., that have been predicted to be a part of an event). For example, the candidate generator 252 can predict the identity and quantity of the participants that will attend a particular meeting before the meeting starts. In some embodiments, the participant candidate generator 252 determines which users will likely be at a particular event based on analyzing some or all of the information collected by the user-data collection component 210 and/or some or all information within the user profile 240 for multiple users. For example, some embodiments analyze one or more emails, chats, or calendar data to determine some or all users who have been invited to a meeting. Accordingly, indicators that identify these users can be written to a data structure to formulate the list of participant candidates of the meeting event.

Alternatively or additionally, within a time window (e.g., 10 minutes) before an event begins, the participant candidate generator 252 analyzes the user relationship object 242(s) of each person invited to a meeting (e.g., via analyzing calendar, email, or text data) to determine other potential users that will attend the meeting even though they may (or may not) be formally invited. For example, the participant candidate generator 252 may walk a network graph of each person invited and their N closest connections (e.g., 5 users with most graph connections) are identified to also be participant candidates. These user relationship objects may be helpful for determining other potential participants of an event where there is no one-to-one correspondence between invitees and those who are actually present at an event, which may help to detect a shared audio source. For instance, only the identity of a team manager may be known but not the actual team members. In this case there may be a good chance that other team members may share an audio source at an event. In this way, embodiments can potentially capture identity of other members not previously known via contextual data for identity determination by the user identity determiner 280 when they use a shared audio source, which is described in more detail below.

The activity monitor 252 monitors user activity (e.g., sounds and utterances) via one or more sensors, (e.g., microphones, video), devices, chats, presented content, and the like. In some embodiments, the activity monitor 252 outputs transcripts (e.g., the transcripts described with respect to the user device 959 of FIG. 9) or activity that happens during an event. For example, activity or content may be timestamped or otherwise correlated with meeting transcripts. In an illustrative example, the activity monitor 252 may indicate a clock time at which a session for a chat for a group begins and ends. In some embodiments, the activity monitor 252 monitors user activity information from multiple user devices associated with the user and/or from cloud-based services associated with the user (such as email, calendars, social media, or similar information sources), and which may include contextual data associated with transcripts or content of an event. For example, an email may detail conversations between two participants of a group that provide context to a computer object by describing details of the meetings, such as the topic of the meeting for a particular chat session within the group. A The activity monitor 252 may determine current or near-real-time user activity information and may also determine historical user activity information, in some embodiments, which may be determined based on gathering observations of user activity over time, accessing user logs of past activity (such as browsing history, for example). Further, in some embodiments, the activity monitor 252 may determine user activity (which may include historical activity) from other similar users (i.e., crowdsourcing).

In some embodiments, using contextual data related to user devices, a user device may be identified by the activity monitor 252 by detecting and analyzing characteristics of the user device, such as device hardware, software such as OS, network-related characteristics, user accounts accessed via the device, and similar characteristics. For example, as described previously, information about a user device may be determined (e.g., the user accounts and devices 246) using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile, such as in the user profile 240. In an embodiment, the user devices may be polled, interrogated, or otherwise analyzed to determine contextual data about the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments devices that sign into an account associated with the user, such as a Microsoft® account or Net Passport, email account, social network, or the like, are identified and determined to be associated with the user.

The shared audio source detector 256 is generally responsible for detecting whether an audio source (or user device that includes an audio source) includes a shared audio source. In some embodiments, this detection can occur before an event begins or without respect to analyzing actual voice utterance data. Rather, these embodiments can, for example, make this determination based on analyzing data collected from the user-data collection component 210 and/or one or more user profiles 240. For example, referring back to FIG. 1, before a meeting begins, the shared audio source detector 256 can analyze an email, text, and/or calendaring data indicating the identity of users 120, 122, 124, that will be in a conference room or use the same telephone for a call. Responsively, the shared audio source detector 256 can map, via the activity monitor 254 or a data structure, the identity of each user to a device ID of the user and data indicating that the device ID is associated with a shared audio source for a particular meeting.

Alternatively or additionally, the shared audio source detector 256 can detect a shared audio source via one or more web cams or other image-based technology. For example, a conference room may have a web cam that generates visual data of a plurality of participants of an event. The device that includes the web cam can transmit this information to the event monitor 250, at which point the shared audio source detector 256 detects, using object detection or recognition algorithms (e.g., via Convolutional Neural Networks (CNN)), that there are multiple people using a single audio source based on two or more people clustered together.

Alternatively or additionally, the shared audio source detector 256 can detect a shared audio source in near-real-time (e.g., relative to the time an utterance is received) or based on analyzing actual utterances that occur in an event. For example, in response to an event beginning (e.g., a conference bridge connects a caller or a user logs into a MICROSOFT TEAMS meeting), the shared audio source detector 256 can activate to engage in monitoring or "listening" for utterances to detect shared audio sources or an audio stream that is shared by multiple users (e.g., from a conference room). The shared audio source detector 256 can do this by detecting overlapping speech (i.e., two or more people speaking at the same time) and/or evaluating value changes (e.g., frequency, wavelength, amplitude) in pitch, tone, and the like and flagging values that are different outside of a threshold. For example, the shared audio source detector 256 can receive a first utterance and metadata associated with the first utterance, such as a device ID where the utterance emanated from. At a second time subsequent to the first time, the shard audio source detector 256 can receive a second utterance and metadata associated with the second utterance, such as information indicating that the second utterance emanated from the same user device. Subsequently, the shared audio source detector 256 can compare the voice profiles of each utterance. If the utterances differ outside of a threshold, then the shared audio source detector 256 determines that there is a shared audio source because both utterances have been mapped to the same user device but both utterances differed outside of a threshold.

In some embodiments, the audio source detector 256 detects a shared audio source in near-real-time relative to the time two or more utterances are detected based on using one or more machine learning models, such as a Gaussian Mixture Model (GMM). GMMs can be used to differentiate between the utterance data of users. That is these models can be used to detect whether voice segments from a shared audio source come from two or more different people without necessarily having to attribute the voice segment to a particular user (e.g., as described above with respect to an HMM). GMMs are models that include generative unsupervised learning or clustering functionality. For a given data set (e.g., voice utterances), each data point (e.g., a single utterance of multiple phenomes) is generated by linearly combining multiple "Gaussians" (e.g., multiple voice utterance sound distributions of multiple users over time). A "Gaussian" is a type of distribution, which is a listing of outcomes of an observation and the probability associated with each outcome. For example, a Gaussian can include the frequency values over a time window of a particular utterance received and predicted frequency value over a next time window. In various instances, a single Gaussian distribution typically formulates a bell-type curve where half of the data falls on the left side of the curve and the other half falls on the right side curve, thereby generally making an even distribution. Typically, two variables—mean defining the center of the curve and the standard deviation—are used. These characteristics are useful for voice data where there are multiple peaks or frequency levels, amplitude levels, wavelength levels, and the like. Multiple Gaussians can be analyzed to determine whether utterances come from the same people using the following formula:

$$y = \frac{1}{\sigma\sqrt{2\pi}} e^{-\frac{(x-\mu)^2}{2\sigma^2}}$$

$\mu$ = Mean $\sigma$ = Standard Deviation $\pi \approx 3.141459 \ldots$ $e \approx 2.71828 \ldots$ This formula represents a probability density function. Accordingly, for a given data point X (e.g., a time slice), we can compute the associated Y (e.g., a phenome frequency value prediction). This is a function of a continuous random variable whose integral across a time window give a probability that the value of the variable lies within the same time window. A GMM is a probability distribution that includes multiple probability distributions or Gaussians, which can be represented by the following:

For d dimensions, the Gaussian distribution of a vector $x = (x^1, x^2, \ldots, x^d)^T$ is defined by:

$$N(x|\mu, \Sigma) = \frac{1}{(2\pi)^{d/2}\sqrt{|\Sigma|}} \exp\left(-\frac{1}{2}(x-\mu)^T \Sigma^{-1} (x-\mu)\right)$$

Where $\mu$ is the mean of $\Sigma$ is the covariance matrix of the Gaussian.

$$\mu = (0, 0)^T \quad \Sigma = \begin{pmatrix} 0.25 & 0.30 \\ 0.30 & 1.00 \end{pmatrix}$$

For D dimensions, where D is the number of features in a data set, the Gaussian distribution of a vector X (where X equals the number of data points (e.g., time windows) analyzed.

Covariance is a measure of how changes in one variable are associated with changes in a second variable. For instance the changes in a first variable is directly proportional to or related to changes in a second variable. The variance-covariance matrix is a measure of how these variables relate to each other. In this way it is related to standard deviation, except when there are more dimensions, the co-variance matrix (and not standard deviation). The covariance matrix can be represented as:

$$v = \begin{bmatrix} \Sigma x_1^2/N & \Sigma x_1 x_2/N & \ldots & \Sigma x_1 x_c/N \\ \Sigma x_2 x_1/N & \Sigma x_2^2/N & \ldots & \Sigma x_2 x_c/N \\ \ldots & \ldots & \ldots & \ldots \\ \Sigma x_c x_a/N & \Sigma x_c x_2/N & \ldots & \Sigma x_c^2/N \end{bmatrix}$$

v is a c x c variance-covariance matrix

N is the number of scores in each of the c data set $x_i$ is a deviation score from the ith data set $\Sigma x_i^2/N$ is the variance of elements from the ith data set $\Sigma x_i x_j/N$ is the covariance for elements from the ith and jth_data set The probability given in a mixture of K Gaussians is:

$$p(x) = \sum_{j=1}^{K} w_j \cdot N(x|\mu_j, \Sigma_j)$$

Where $w_j$ is the prior probability (weight) of the jth Gaussian.

$$\sum_{j=1}^{K} w_j = 1 \right) \text{ and } 0 \leq w_j \leq 1$$

The output is a predicted class, such as determining or predicting whether two different Gaussian distributions or utterances emanate from the same user. One problem that embodiments solve is given a set of Data $X = x_1 \ldots x_2 \ldots x_n$ drawn from an unknown distribution (a GMM), embodiments estimate parameters (theta) of the GMM model that fits the data. Embodiments maximize the likelihood p(X|O) (probability of X given the parameters) of the data or that X belongs to a certain class, as represented by:

$$\theta^* = \frac{\text{argmax} p(X|\theta)}{\theta} = \frac{\text{argmax}}{\theta} \prod_{i=1}^{N} p(x_i|\theta)$$

This formula represents a probability density function. Accordingly, for a given data point X (e.g., a time slice), we can compute the associated Y (e.g., a phenome frequency value prediction). This is a function of a continuous random variable whose integral across a time window give a probability that the value of the variable lies within the same time window.

Embodiments find the maximum probability value for a given class. Accordingly, embodiments predict a class (or identity of a user) that a data point X (e.g., a time slice of phenome frequency values) is the most likely to be a part of. For example, classes can be made as first user and second user. The observations can be a first time slice of a first utterance and a second time slice of a second utterance and embodiments predict whether the first and second utterances emanate from the first user or the second user using the functionality described above. In this way, GMMs can be used to differentiate between speakers or determine whether voice utterance data is coming from the same or other users (without necessarily identifying who the users are).

The user identity determiner 280 is generally responsible for determining the identity of a particular user associated with a particular utterance, as well as additional information or metadata associated with the identified user (e.g., number of people using a shared audio source, who is currently speaking, and the like). The utterance detector 282 is generally responsible for detecting an utterance (e.g., a natural language word or set of phenomes) of a user. In some embodiments, the utterance detector 282 uses natural language processing and/or other techniques (e.g., machine learning models) to distinguish a natural language utterance or sound from other background noises (e.g., a pen clicking or chair moving). For example, the utterance detector 282 can perform speech-to-text functionality and an NLP module breaks or tokenizes character sequences (e.g., messages) from the group event joins or concatenates other character sequences (e.g., semantically similar words) and/or tags (e.g., part-of-speech) to the tokenized character sequences. In this way, messages may be parsed into its words and some or each of the words are tagged with a part-of-speech identifier. "Tokenization" or parsing in various embodiments corresponds to a computer-implemented process that segments the content into words, sentences, symbols, character sequence, and/or other elements of the content. "Syntax" or syntactic properties refers to the structure of character sequences of the content (as opposed to the semantics or meaning), such as the structure of a sentence. This can include a set of rules for analyzing a message, such as word and/or POS order.

In some embodiments, NLP derives semantic and syntactic content of semi-structured or unstructured data (e.g., data in image files, data in blogs, posts, websites, text descriptions of classifier models). This is in contrast to analyzing "structured" data, such as data in a database. NLP can be configured to parse content to determine semantic context (e.g., meaning of words by analyzing each word in the content against each other and against training data) and syntax context (e.g., the set of rules that govern structure of sentences in a given language). NLP is configured to recognize keywords, contextual information, and metadata tags associated with one or more portions of a set of data. In certain embodiments, NLP analyzes summary information, keywords, text descriptions included in the set of data, and uses syntactic and semantic elements present in this information to identify the interest contexts. The syntactic and semantic elements can include information such as word frequency, word meanings, text font, italics, hyperlinks, proper names, noun phrases, parts-of-speech (e.g., noun, adverb, adjective, and the like) and/or the context of surrounding words. Other syntactic and semantic elements are also possible.

In some embodiments, the utterance detector 282 detects an utterance and determines that the utterance came from a shared audio source (e.g., detected by the shared audio source detector 256). For example, the utterance detector 282 can receive a flag or communication from the shared audio source detector 256 that the utterance came from a shared audio source.

The voice recognition component 284 is generally responsible for determining an identity of users or event participants based at least in part on the detecting of an utterance by the utterance detector 282. In this way, the voice recognition component 284 attributes or assigns utterances detected by the utterance detector 282 to particular participants or users. For example, at a meeting event the utterance detector 282 may detect a first utterance. Responsively, the voice recognition component 284 compares the utterance to the voice input sample(s) 245 (and/or other voice input samples) to determine if the utterance (or an indication of the utterance, such as a feature vector that represents the utterance) matches or is within a threshold similarity (e.g., a Euclidian distance to another feature vector representing the voice input sample(s) 245) of the voice input sample(s) 245. If the utterance is within a threshold similarity to a particular voice input sample, the tagged or associated classification (i.e., user) is attributed to the utterance and vice versa. Likewise, if the utterance is not within a threshold similarity to a particular voice input sample, the classification is not attributed to the utterance and vice versa.

In some embodiments, the functionality of the voice recognition component 284 is made based on information derived from the voice learning component 260. As described herein, the voice learning component 260 can determine or learn a pattern in the amplitude, frequency, and/or wavelength values of one or more voice input samples that a user has uttered. For example, a machine learning model can be trained by first receiving historical telephone calls, smart speaker utterances, video conference auditory data, and/or any voice input samples of a particular user's voice. Responsively, the machine learning model can extract amplitude, frequency, and/or wavelength features to learn what values (e.g. a particular Hertz or Decibel level) of those features that the particular user speaks at and weight these accordingly to indicate a pattern in such values. Thus, for example, when an incoming utterance is analyzed, it can be converted into a feature vector and run through the trained machine learning model to determine its distance to other feature vectors representing the voice input samples, and therefore determine the identity of a user that made the utterance, as described for example with respect to FIG. 5.

In some embodiments, the voice recognition component 284 uses the HMM (and/or the GMM) described herein to attribute utterances for each user using a shared audio source. For example, in response to the GMM determining that two sets of Gaussians (i.e., a first utterance and a second utterance) belong to different users as described herein, both of the Gaussian sets can be fed through one or more HMMs to specifically attribute each Gaussian set to a user. That is, for instance, embodiments can split the utterances into a separate stream/bucket (or other data structure) for each individual and responsively use previously trained models (e.g., used by the voice learning component 260) to map each stream to a specific user. Specifically, for example, a series of known observations representing a sequence or chunk of amplitude, frequency, and/or wavelength values included in a first utterance can be received for time window X (which includes a series of time slices: T1, T2 and T3). For example, at T1 there is a first set of observed frequency values, at T2 there is a second set of observed frequency values, and at T3, there is a third set of observed frequency values of the first utterance. As described by the algorithms and equations herein with respect to the voice learning component 260, a series of hidden states (e.g., an identity of a user who made each of the three observations) is determined in the Markov chain along T1, T2, and T3 of the time window X. Because of the Markov chain assumption that any prediction is based only on the current state, as opposed to states before the current state, embodiments can predict the identity of users that make each of the three observations based only on an immediately prior-in-time observation. For example, if it is determined that the first observation of frequency values at T1 are likely uttered by John (e.g., by using the voice learning component 260), then there is a high likelihood that the second and third observations of frequency values at T2 and T3 are also uttered by John. Responsively, the voice recognition component 284 attributes the first utterance (and all 3 observations included in the first utterance) to John. This process may be repeated for each utterance detected from the shared audio source.

In some embodiments, the voice recognition component 284 attributes utterances to users or otherwise performs its functionality based at least in part on information in the user relationship object(s) 242, the user-data collection component 210, and/or the user profile 240. For example, the voice recognition component 284 can analyze an email or other resource indicating a timeslot during a meeting for which one or more particular participants will speak. The voice recognition component 284 can responsively weight a confidence or prediction higher or otherwise analyze utterances based on the timeslot. For example, if is determined that Jain will speak during the first 5 minutes of a meeting, the voice recognition component 284 can first compare any utterance received to Jain's voice input sample(s) (or associated HMM) to confirm that Jain is indeed the one speaking. Additionally or alternatively, the confidence score or prediction that Jain is speaking can be weighted higher.

In some embodiments, the voice recognition component 284 attributes utterances to users or otherwise performs its functionality based at least in part on providing information within the user relationship object(s) 242 as input to one or more machine learning models. As described above, the input of the participant candidate(s) into a machine learning model is an improvement over existing technologies or models because existing technologies use large quantities of (and only) voice or utterance data (e.g., voice frequency values) as input to determine an identity of a user. If an organization has thousands of employees, for example, it is computationally infeasible to map or compare a detected utterance to any of the thousands of trained voice models (assuming that every employee's voice was trained). Accordingly, in some embodiments, the voice recognition component 284 performs intelligent "pruning" by using information in the user relationship object(s) 242 to limit the number of potential voice input samples that each utterance is compared against (e.g., by the voice recognition component 284). In an illustrative example, if an employer had 1000 employees and one or more models were used to train on each employee, only 30 of those employees may be determined to be the participant candidates based on the user relationship object(s) 242 indicating that only 30 employees are candidates. Accordingly, the machine learning model(s) used by the voice recognition component 284 only compares the learned voice samples of these 30 employees (as opposed to all 1000) against an utterance. This also improves the accuracy of the voice recognition model(s)/layer(s) 302, as described herein.

In some embodiments, the voice recognition component 284 loads additional voice input samples or models (and potentially discards others) based on not classifying or otherwise not determining an identity of a user. In this way, embodiments dynamically relax the constraints of the candidate list selection if the current candidate list is not adequate. In other words, for example, if the participant candidate generator 252 loads or indicates participants who are to participate in a meeting, but during the meeting an utterance does not belong to any of the candidates, the voice recognition component 281 can look outside of the participant candidates for a match.

In some embodiments, the voice recognition component 281 adjusts weights of a machine learning model (e.g., an HMM) based on real-time information in an event. For example, as a meeting call progresses, embodiments can adjust the weights of an HMM model when the model predicts that the same people are always talking. In an illustrative example, if embodiments detect 3 unique utterances and one of those 3 people is always speaking, then when a new utterance is detected there is a very high chance that the new voice is one of those 3 people (and not one of the other people in the potentially large candidate list generated by the participant candidate generator 252). This should increase performance and even accuracy.

The current speaker component 286 is generally responsible for determining the identity of the user who is currently speaking (making one or more utterances) at an event or who was the most recent user to speak even though no one is currently speaking. In some embodiments, the current speaker component 286 determines in near-real-time (relative to the time at which an utterance is received) who is speaking or has most recently spoken. In an illustrative example, the utterance detector 282 can first detect an utterance. Responsively and in near-real-time (relative to when the utterance is detected), the voice recognition component 284 can run the utterance through a GMM and HMM respectively as described herein, which attributes the utterance to Anne. Responsive to this attribution, and in near-real-time (relative to the utterance attribution), the current speaker component 286 can determine that Ann is currently making utterances. The presentation component 220 can then cause display of the indicator that specifies "Anne is currently talking." Alternatively or additionally, the current speaker component 286 uses contextual data to determine who is currently speaking or has most recently speaking. For example, the current speaker component 286 can receive a text or email resource that indicates a timeslot for which Anne will speak. Accordingly, in response to the beginning of the timeslot, the current speaker component 286 can determine that Anne is currently speaking.

The speaker count component 290 is generally responsible for determining (or indicating) the quantity of users that are using a shared audio source. In some embodiments, the speaker count component 290 determines or indicates the quantity of users that use a shared audio source based on populating an object or data structure that represents a shared audio source in near-real-time relative to the time an utterance is received. For example, the shared audio source detector 256 can first determine that device ID 1 includes a shared audio source. Responsively, the utterance detector 282 can first detect an utterance at device ID 1. Responsively and in near-real-time (relative to when the utterance is detected), the voice recognition component 284 can run the utterance through a model as described herein, which attributes the utterance to Jain. Responsive to this attribution, and in near-real-time (relative to the utterance attribution), the speaker count component 290 component can populate a data structure that indicates that Jain (and only Jain) has spoken from the shared audio source. The presentation component 220 can then cause display of the indicator that indicates Jain (e.g., as illustrated in the computer display 1020 of scene 150, except without the "Naz," "Javier," and "Liam" indicators). Subsequently, the utterance detector 282 can detect a second utterance at the same device ID 1.

Responsively and in near-real-time (relative to when the second utterance is detected), the voice recognition component 284 can run the second utterance through a model as described herein, which attributes the second utterance to Javier. Responsive to this attribution, and in near-real-time (relative to the second utterance attribution), the speaker count component 290 can populate the same data structure that indicates that Jain and Javier have both spoken from the shared audio source. The presentation component 220 can then cause display of the indicator that both Jain and Javier have spoken from the same audio source (e.g., as illustrated in the computer display 1020 of scene 150, except without the "Naz," and "Liam" indicators).

In some embodiments, the speaker count component 290 additionally or alternatively uses contextual data to determine or indicate the quantity of users that are using a shared audio source. For example, the speaker count component 290 can receive an indication from the user-data collection component 210 that there will be 5 users attending a meeting in a single conference room X. Accordingly, the speaker count component 290 can determine the quantity to be 5. Responsively, the presentation component 220 can cause display, to a user device, of an indicator that reads "conference room X has 5 users" or the like.

Example system 200 also includes a presentation component 220 that is generally responsible for presenting content and related information to a user, such as indicators generated by the user identity determiner 280. Presentation component 220 may comprise one or more applications or services on a user device, across multiple user devices, or in the cloud. For example, in one embodiment, presentation component 220 manages the presentation of content to a user across multiple user devices associated with that user. Based on content logic, device features, and/or other user data, presentation component 220 may determine on which user device(s) content is presented, as well as the context of the presentation, such as how (or in what format and how much content, which can be dependent on the user device or context) it is presented, when it is presented. In particular, in some embodiments, presentation component 220 applies content logic to device features, or sensed user data to determine aspects of content presentation.

In some embodiments, presentation component 220 generates user interface features associated with a computer object generated by the composite view object generator 280 and/or the associated computer resource. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. For example, the presentation component 220 can present: an indicator that indicates the identity of one or more users who have used a shared audio source (e.g., similar to the computer display 1020 of scene 1050), an indicator indicating an identity of who is currently speaking, and the like.

In some embodiments, a personal assistant service or application operating in conjunction with presentation component 220 determines when and how (e.g., presenting only sharing gestures and/or contextual data as opposed to an entire meeting transcript) to present the content. In such embodiments, the content, including content logic, may be understood as a recommendation to the presentation component 220 (and/or personal assistant service or application) for when and how to present the notification, which may be overridden by the personal assistant application or presentation component 220.

Continuing with FIG. 2, as described previously, example system 200 may include or operate in conjunction with one or more consumer applications 290. Consumer applications 290 generally refers to one or more computer applications or services, such as online/cloud applications or locally stored applications that consume or utilize the computer objects or computer resources determined by system 200. In particular, a consumer application 290 may receive a sharing gesture for a group, and present, manage, or schedule aspects (e.g., contextual data) of the sharing gesture to the group. In some embodiments, a consumer application 290 may utilize the presentation component 220 to provide a computer object generated by the composite view object generator 280 to a user within a particular group. Examples of consumer applications 290 may include, without limitation, computer applications or services for facilitating meetings or communications (e.g., MICROSOFT TEAMS®, MICROSOFT DYNAMICS®); email, messaging, chat, or calling; project management; calendar or scheduling.

Example system 200 also includes storage 225. Storage 225 generally stores information including data, data structures, computer instructions (e.g., software program instructions, routines, or services), and/or models (e.g., machine learning models) used in some embodiments of the technologies described herein. In an embodiment, storage 225 comprises a data store (or computer data memory). Further, although depicted as a single data store component, storage 225 may be embodied as one or more data stores (e.g., a distributed storage network) or may be in the cloud. Storage 225 includes the group profile 240.

Figure 3:
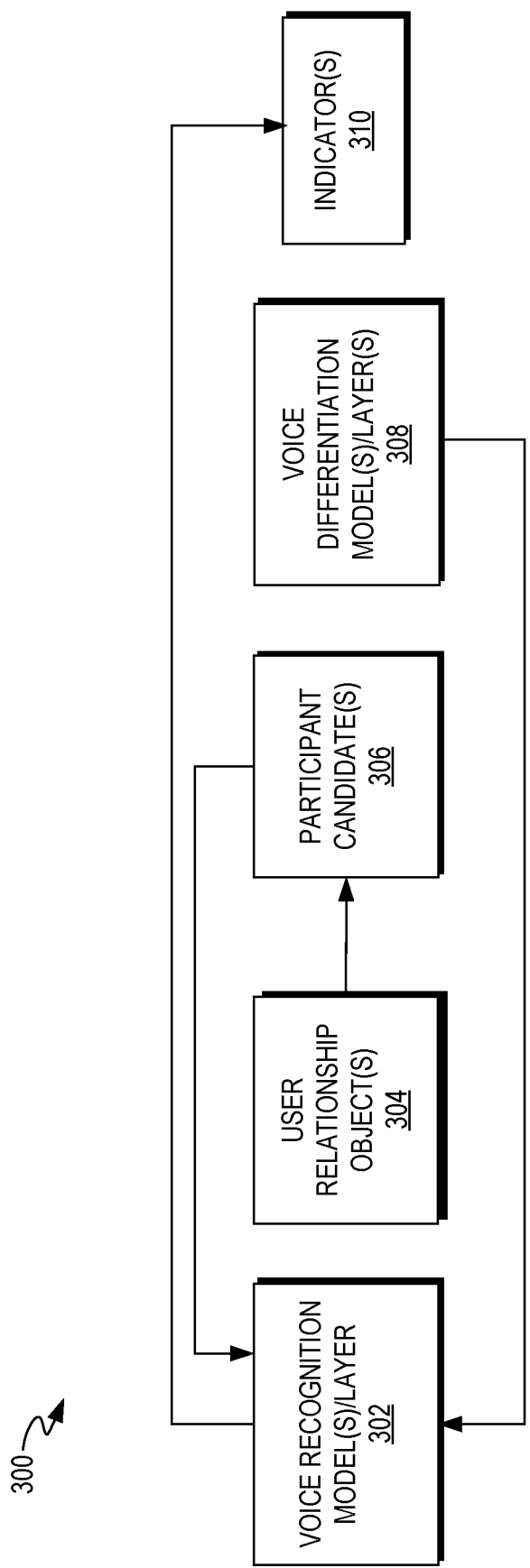
FIG. 3 is a block diagram of an example system illustrating one or more models, or layers of a single model, that can be utilized to generate one or more indicators that identify one or more users that have made an utterance, in accordance with embodiments of the present disclosure.

FIG. 3 is a block diagram of an example system 300 illustrating one or more models, or layers of a single model, that can be utilized to generate one or more indicators that identify one or more users that have made an utterance, according to some embodiments. In some embodiments, the voice learning component 260 and/or the user identity determiner 280 of FIG. 2 utilizes the voice recognition model(s)/layer(s) 302 to perform its respective functionality. Additionally, in some embodiments, the user identity determiner 280 utilizes the voice differentiation model(s)/layer(s) 308 to perform its functionality. In some embodiments, the user relationship object(s) 304 represent the user relationship object(s) 242 of FIG. 2. In some embodiments, the participant candidate generator 252 of FIG. 2 generates the participant candidate(s) 303. In some embodiments, the user identity determiner 280 of FIG. 2 generates the indicator(s) 310 and the presentation component 220 of FIG. 2 causes presentation of such indicator(s) 310, as described with respect to FIG. 2.

The system 300 indicates that the participant candidate(s) 306 are generated based on the user relationship object(s) 304. For example, before a meeting begins, a list of participant candidates 306 (e.g., individuals who are likely to participate in a meeting) may be generated based on using a network graph. Specifically, for example, embodiments can select the top N users who contributed most to files that are related to the meeting, where the users and files are nodes or vertices in a network graph. Network graphs are described in more detail herein.

The system 300 additionally illustrates that the list of participant candidate(s) 306 is fed or provided into the voice recognition model(s)/layer(s) 302 as input. The voice recognition model(s)/layer(s) 302 are generally responsible for attributing (or predicting that) a detected utterance to an identity of one or more users. In some embodiments, the voice recognition model(s)/layer(s) 302 represent the HMM, LSTM, or other machine learning models, as described herein. As described above, the input of the participant candidate(s) 306 into the voice recognition model(s) layer(s) 302 is an improvement over existing technologies or models because existing technologies use large quantities of (and only) voice or utterance data (e.g., voice frequency values) as input to determine an identity of a user. If an organization has thousands of employees, for example, it is computationally infeasible to map or compare a detected utterance to any of the thousands of trained voice models (assuming that every employee's voice was trained). Accordingly, the system 300 illustrates intelligent "pruning" by using information in the user relationship object(s) 304 to limit the number of potential voice input samples that each utterance is compared against (e.g., by the voice recognition component 284). In an illustrative example, if an employer had 1000 employees and one or more models were used to train on each employee, only 30 of those employees may be determined to be the participant candidates 306 based on the user relationship object(s) 304 indicating that only 30 employees are candidates. Accordingly, the voice recognition model(s)/layer(s) 302 only compares the learned voice samples of these 30 employees (as opposed to all 1000) against an utterance by the voice recognition model/layer 302. This also improves the accuracy of the voice recognition model(s)/layer(s) 302, as described herein.

The system 300 also illustrates that in certain embodiments, the voice recognition model(s)/layer(s) 302 performs its functionality subsequent to or in response to the voice differentiation model(s)/layer(s) 308 performing its functionality. In some embodiments, the voice differentiation model(s)/layer(s) 308 represent GMM functionality, as described herein. The voice differentiation model(s)/layer(s) 308 is generally responsible for detecting a shared audio source or determining that two or more utterances were not spoken by the same user. In this way, the voice differentiation model(s)/layer(s) 308 and the voice recognition model(s)/layer(s) can be used to identify a user (e.g., a currently active speaker) indicative of speaker diarization. "Speaker diarization" is the process of labelling a voice signal or utterance with labels corresponding to the identity of the speakers or users. In order to do this, the voice differentiation model(s)/layer(s) 308 can first differentiate between speakers by determining, for example, that two voice streams/buckets do not come from the same user, as described herein with respect to the GMM. Responsively, the voice model(s)/layer(s) 302 may assign or attribute each voice fragment or utterance to a specific user. For example, in a GMM context, multiple Gaussian distributions may be aggregated to form a first utterance or voice segment. Likewise, another multiple Gaussian distributions may be aggregated to form a second utterance or voice segment. The first utterance and the second utterance can be determined to belong to different users as described herein. After this determination, the multiple Gaussian distributions (or the first and second utterances) can be specifically attributed to a user (e.g., via an HMM model).

In some embodiments, the system 3000 additionally includes one or more other model(s)/layer(s) to determine the probability that a particular speaker will likely speak in an upcoming or future (not yet occurred) time window. This can be used as a signal or input into the voice differentiation model(s)layer(s) 308 and/or the voice recognition model(s)/layer(s) 302 to differentiate between speakers and/or attribute an utterance or voice stream to an identity of a user respectively. In some embodiments, this includes any suitable conditional probability functionality or models, such as maximum likelihood estimation, Bernoulli regression, conditional Gaussian regression, generalized linear models, Poisson regression, statistical learning formulation, and the like. In some embodiments, this conditional probability functionality uses NLP or other semantic functionality (e.g., WORD2VEC) to determine the probability that a user will stop/start speaking. For example, using NLP, embodiments can determine that an utterance of a particular user ended in a question mark (e.g., Sarah: "Naz, did you send the document?"). Given the question mark, there is a high probability that Sarah will not be the next speaker. Accordingly, using an HMM or other model, utterance attribution to Sarah can be weighted or scored lower for voice attribution since she is not likely to speak next.

The system 300 illustrates that in response to the voice recognition model(s)/layer(s) 302 performing its functionality, one or more indicators 310 are generated. For example, in response to determining an identity of a speaking user via the voice recognition model(s)/layer(s) 302, the presentation component 220 can cause presentation of an indicator 310 indicative of an identity of some or all users whose utterances have been detected. Additionally or alternatively, the presentation component 220 can cause presentation of another indicator 310 indicating the currently speaking user. Additionally or alternatively, embodiments cause presentation of an indicator 310 indicative of a quantity of people that share an audio source.

Figure 4:
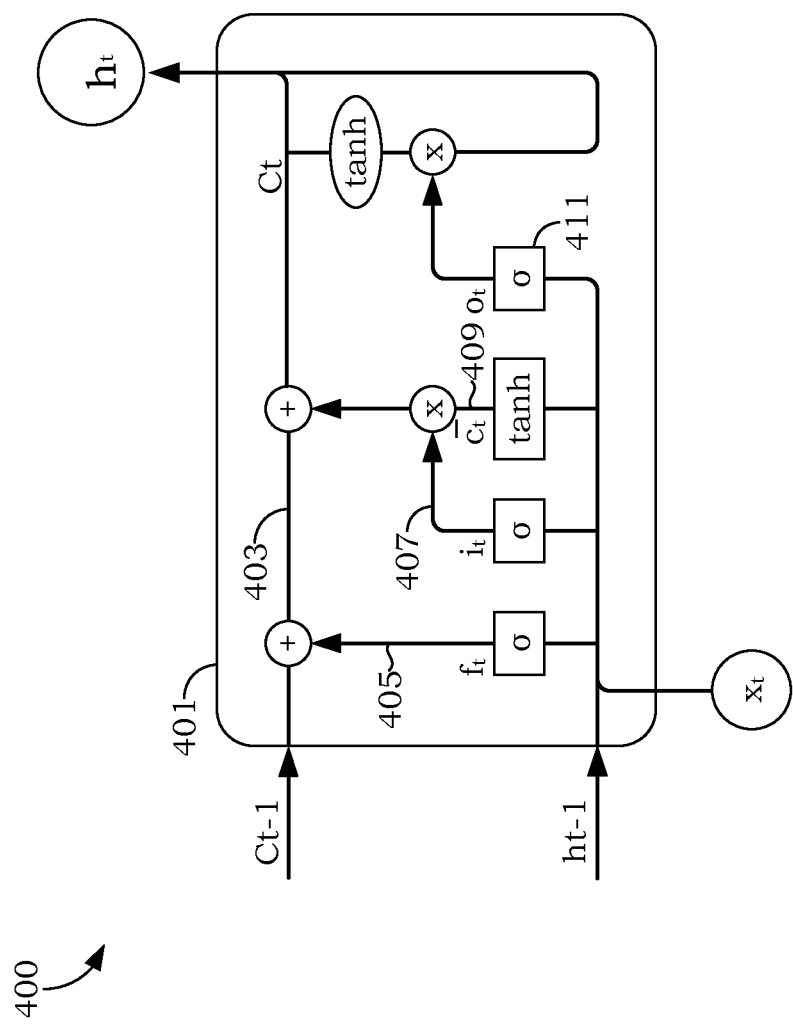
FIG. 4 is a schematic diagram illustrating how utterances are attributed to a specific user using a Long Short Term Memory (LSTM) model, in accordance with embodiments of the present disclosure.

FIG. 4 is a schematic diagram illustrating how utterances are attributed to a specific users using a Long Short Term Memory (LSTM) model 400, according to some embodiments. In some embodiments, the LSTM 400 represents the voice recognition model/layer 302 and/or the voice differentiation model(s)/layer(s) 308. Additionally or alternatively, in some embodiments, the LSTM 400 represents functionality performed by the user identity determiner 280 to determine an identity of a speaking user. Although FIG. 4 illustrates an LSTM, it is understood that this is illustrative only and that any quantity or type of suitable components can exist. For example, in some embodiments, other models (e.g., an HMM) can be alternatively used instead of an LSTM.

FIG. 4 illustrates how a vector representing a particular portion of an utterance or voice segment is attributed to an identity of a speaking user based on past analyzed utterances or voice segments. LSTM models function assumes that a downstream event (or later-in-time event, such as phoneme frequency values) depends upon, and is a function of, one or more events that came before. In other words, LSTM is a model that shares weights over time. In a voice context, the model can learn voice patterns over time based on past voice observations (e.g., determine the identity of a user (or next utterance) based on a detection of the phrase "ok, let's get this party started," which a first user always states before a meeting starts.

Element or cell 401 represents a vector representing a portion (e.g., a sub-utterance or voice segment) of an utterance. In an illustrative example, the cell 401 may represent a voice segment indicative of particular amplitude, frequency, and/or wavelength values of a set of phenomes. The cell state 403 corresponds to selective memory of past cell states (i.e., it takes data (e.g., vector values) that has been forgotten or disregarded and data that has been remembered or preserved) and passes on remembered data to the next cell or step. When data arrives at the last cell (representing the last-in-time portion of an utterance), $C_t$ is linearly combined with $h_{t+1}$ such that $h_{t+1}$ is the final output.

In various embodiments, the first operation occurs when the forget gate layer 405 (a sigmoid layer) determines what vector values gets removed from the cell state 403, as represented by $f_t=\sigma(W_f \cdot [h_{t-1}, x_t]+b_f)$. It takes $h_{t-1}$ (the previous cell state corresponding to a previous portion of an utterance (e.g., the utterance "for" in the phrase "for sale")) and $x_t$ (current vector values) and outputs a number between 0 and 1. A value close to or within a threshold of value of 1 indicates true or keep this data while a 0 or value within a threshold value of 0 indicates forget or get rid of the data. A previous cell state indicates at least a portion the vector values that were passed from the previous cell, as opposed to the overall sell state that indicates at least a portion the data that was passed for at least a portion of cells (e.g., vectors or portions of an entire utterance) up until a particular point.

In various embodiments, the next operation is to determine what information will be stored or moved along the cell state 403, as represented by $i_t=\sigma(W_i \cdot [h_{t-1}, x_t] b_i)$; $\tilde{C}_t=\tan h(W_C \cdot [h_{t-1}, x_t]+b_c)$. This occurs via the input gate layer 407 (another sigmoid layer) and the tan h layer 309. The gate layer 407 determines which vector values will be updated and the tan h layer 409 generates a single vector of new candidates $C_t$. In an example illustration, embodiments can forget utterance portions or vector representations that are: duplicative, outside of a time window threshold, are below a frequency/wavelength/amplitude threshold (e.g., indicative of a whisper or mumble), and/or are above a frequency/wavelength/amplitude threshold (e.g., indicative of shouting).

Certain embodiments then update the old cell state 403 ($C_{t-1}$) into the new cell state $C_t$, as represented by $C_t=f_t * C_{t-1}+i_t*\tilde{C}_t$. Accordingly, the old cell state ($C_{t-1}$) is multiplied by 405, forgetting the vectored values described above. Then, the input gate layer 407\*the tan h layer 309 is added. In the last step, it is determined what is outputted, which is represented by $o_t=\sigma(W_o[h_{t-1}, x_t]+b_o)$; $h_t=o_t*\tan h(C_t)$. The output is based on the new cell state $C_t$, which is a filtered version of the cell state. A sigmoid layer determines what parts of the cell state 403 ($C_{t-1}$) will be output. The cell state 403 is run through tan h so that the values are between −1 and 1, represented by the final output $h_{t+1}$. And this is multiplied by the sigmoid gate 411 so only the necessary values are outputted. In various embodiments, the final output $h_{t+1}$ includes attributing each of the voice utterance portions (or the voice utterance in aggregate) to an identity of a speaker. Accordingly, the output of the cell 401 (assuming that this is the last portion of the utterance/voice segment) is a single vector where each value of the vector is a non-binary (e.g., float, integer, decimal) between −1 and 1 and where each value represents the probability of the voice utterance being uttered by a particular user speaker.

Figure 5:
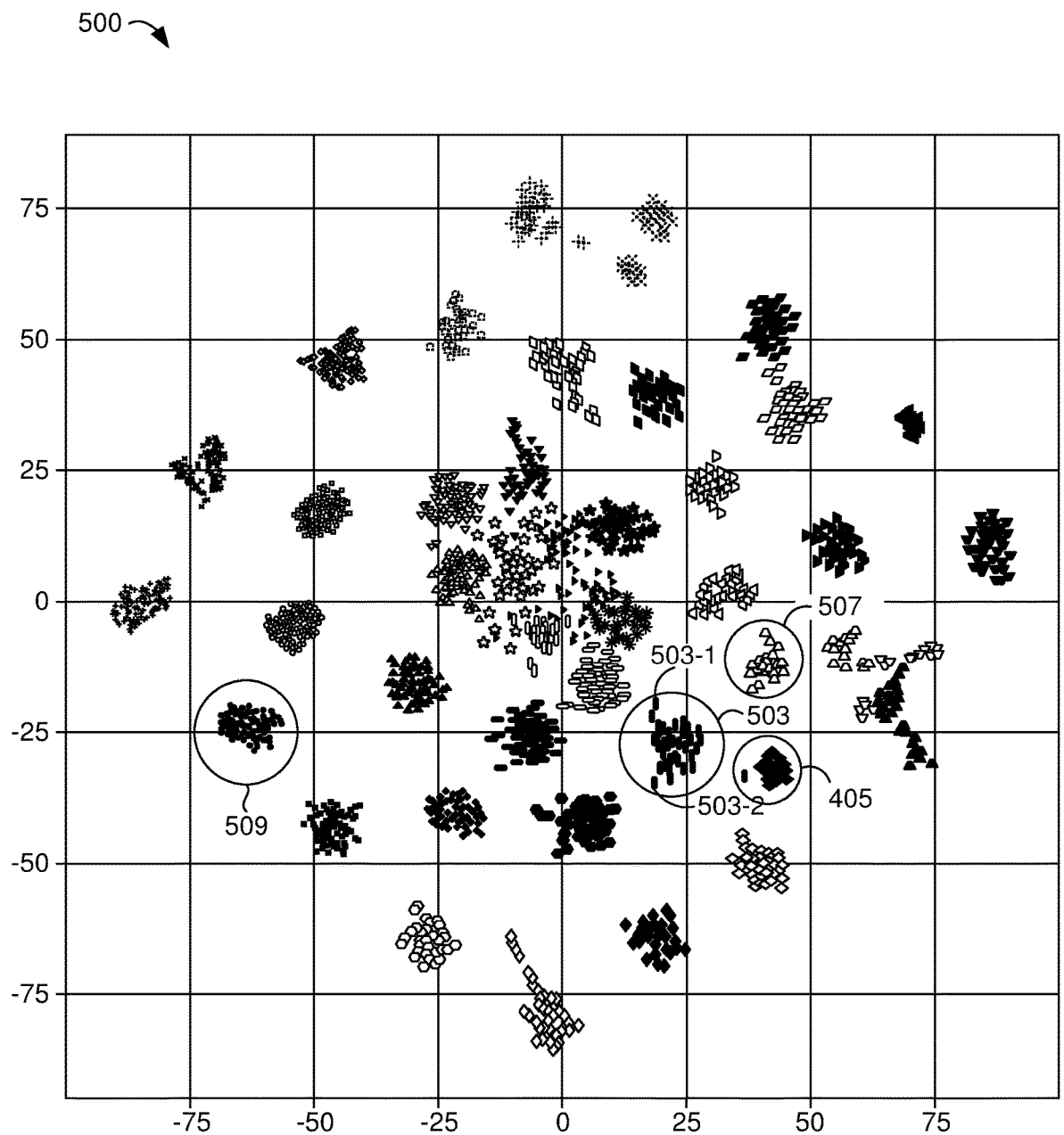
FIG. 5 is a schematic diagram of an example visualization of a voice utterance or voice input sample feature space that includes various voice utterances or voice input sample feature vectors, in accordance with embodiments of the present disclosure.

FIG. 5 is a schematic diagram of an example visualization of a voice utterance or voice input sample feature space 500 that includes various voice utterance or voice input sample feature vectors, according to some embodiments. In some embodiments, the voice utterance feature space 500 represents the output of the voice recognition model(s)/layer(s) 301 and/or voice differentiation model(s) layer(s) 308. In some embodiments, the voice utterance feature space 500 represents any feature space described herein, such as described with respect to the output of the voice learning component 260 and/or the user identity determiner 280. In some embodiments, the feature space 500 represents an embedding layer included within (or prior to) the LSTM 400 of FIG. 4 in order to convert utterances to vectors. In some embodiments, the feature space 500 includes clusters of data points (e.g., data point 503-1 and data point 503-2) representing individual feature vectors corresponding to voice utterance feature(s) and/or voice input samples of training or test utterances. These data points are clustered together to form a particular utterance or voice input sample class (e.g., an identity of a user). For example, the data point 503-1 and data point 503-2 have been classified as "John" 503 (indicative that various past utterances or voice input samples were uttered by John). There are other classes, such as class 505 (e.g., utterances made by "Jain") and the class 507 (e.g., utterances made by "Naz").

In an illustrative example of how the feature space 500 is used, embodiments may receive a first utterance from an audio source and then a second utterance by the same audio source (i.e., a shared audio source). Responsively, some embodiments run the voice utterances through one or more machine learning models (e.g., the voice recognition model(s)/layer(s) 302)) in order to weight utterance features (e.g. amplitude and frequency values) for an utterance, after which a feature vector (e.g., representing the data point 503-1) is embedded in the feature space 500. The feature space 500 in various embodiments represents a multidimensional coordinate system where each feature is associated with a dimension. For example, a first set of phenomes may be plotted where a first axis represents a voice frequency and the second axis represents amplitude values of the set of phenomes. Each feature value within the feature vector may be summed or otherwise aggregated to arrive at a final coordinate point (e.g., the data point 503-2) within the feature space 500. Each of the data points within the class 503, for example, are within a feature similarity threshold and so they are close to each other (e.g., based on Euclidian distance) in the image style feature space 500. Responsive to the embedding of the feature vector in the feature space 500, embodiments classify the first and second utterance. For example, if the first utterance represents data point 503-1, then the cluster or classification that is nearest to the data point 503-1 is the "John" Classification 503 indicative of John having uttered the first utterance, as opposed to any other individuals corresponding to the class 505 or 509, for example.

The machine learning model(s) is able to cluster samples of new unseen utterances (e.g., any utterance received after training by the voice learning component 260). In some embodiments, every utterance or voice sample class is represented by the median of its samples' embeddings as shown below:

$$C_j = \text{median}\{f_{embed}(S_i^j): I=1,2,\ldots,n\]$$

Where $f_{embed}$ is the output of the model, is the $i^{th}$ sample of the $i^{th}$ utterance or voice sample class. The prediction for any test sample X is given by:

$$Pred(X) = \underset{j}{\operatorname{argmin}} \|C_j - f_{embed}(X)\|.$$

However, it is understood that median is just one way to represent an embedding of the voice utterance. Some embodiments alternatively use other statistics like mean, pth percentile, and the like.

Figure 6:
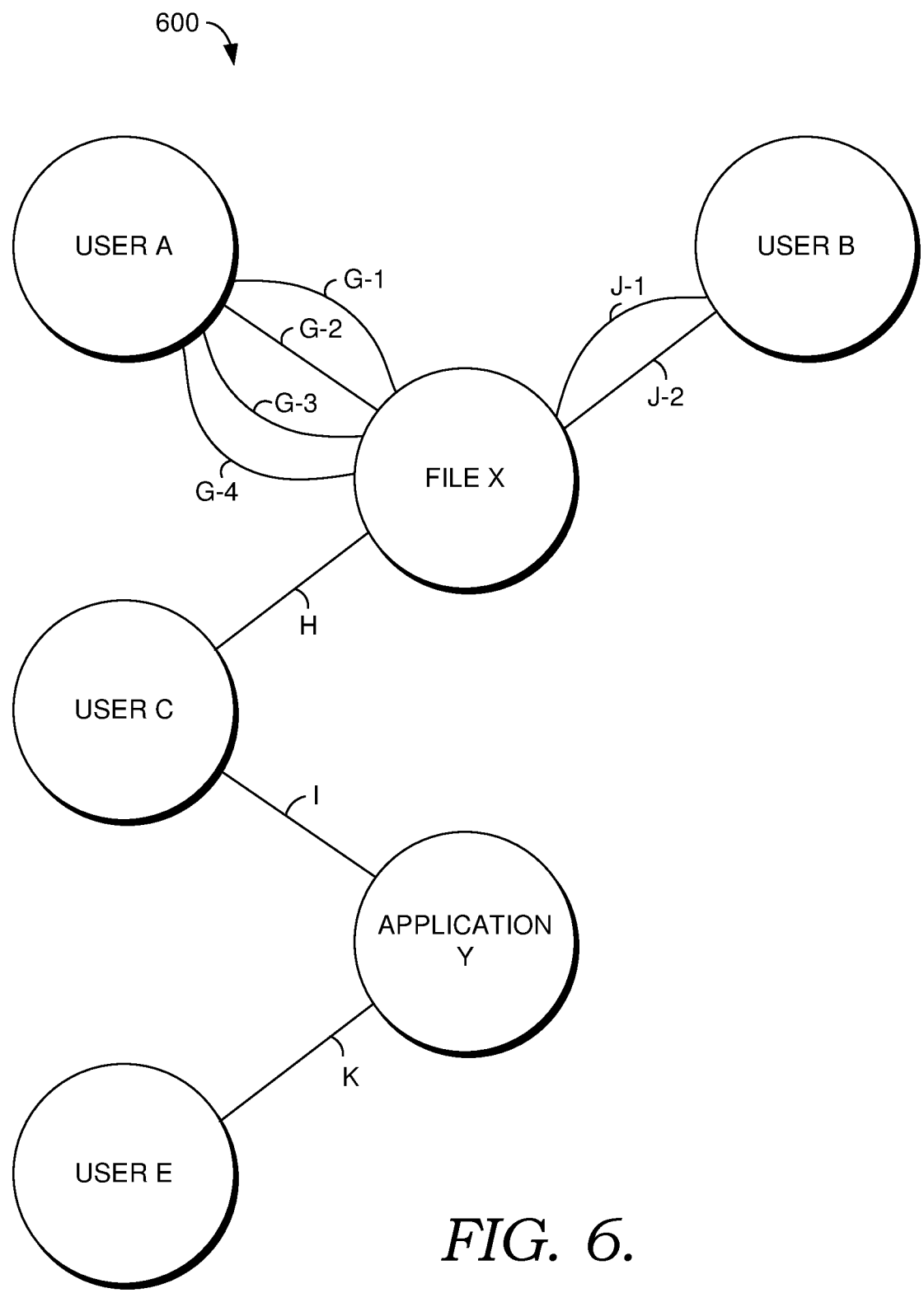
FIG. 6 is a schematic diagram of an example network graph, in accordance with embodiments of the present disclosure.

FIG. 6 is a schematic diagram of an example network graph 600, according to some embodiments. In some embodiments, the network graph 600 represents the user relationship object(s) 242 of FIG. 2 and/or the user relationship object(s) 304 of FIG. 3. A network graph is a pictorial representation or visualization for a set of objects where pairs of objects are connected by links or "edges." The interconnected objects are represented by points termed "vertices," and the links that connect the vertices are called "edges." Each node or vertex represents a particular position in a one-dimensional, two-dimensional, three-dimensional (or any other dimensions) space. A vertex is a point where one or more edges meet. An edge connects two vertices. Specifically, the network graph 600 (an undirected graph) includes the nodes or vertices of: "user A," "user B," "file X," "user C," "application Y," and "user E." The network graph further includes the edges K, I, H, J-1, J-2, and G-1, G-2, G-3, G-4.

The network graph 600 specifically shows the relationships between various users and computer resources, such as file X and application Y. It is understood that these computer resources are representative only. As such, the computer resources may alternatively or additionally be calendars that users have populated, groups that users belong to, chat sessions that users have engaged in, text messages that users have sent or received, and the like. In some embodiments, the edges represent or illustrate the specific user interaction (e.g., a download, sharing, saving, modifying or any other read/write operation) with specific computer resources.

Representing computer resources as vertices allow users to be linked in a manner they may not have otherwise have been. For example, application Y may represent a group container (e.g., MICROSOFT TEAMS) where electronic messages are exchanged between group members. Accordingly, the network graph 600 may illustrate which users are members of the same group. In another illustrative example, the network graph 600 may indicate that user A downloaded file X at a first time (represented by edge G-1), a second time (represented by edge G-2), a third time (represented by edge G-3), and a fourth time (represented by edge G-4). The graph 600 may also illustrates that user B also downloaded the file X, as represented by the edge J-1 and wrote to the file X at another time, as represented by the edge J-2. Accordingly, the network graph 600 illustrates a much stronger relationship between the user A and File X relative to user B based on the edge instances illustrated between the respective nodes (e.g., User A downloaded File X more times relative to user B). In other embodiments, the thickness of an indication of a single edge is indicative of the degree of relationship strength. For example, instead of indicating 4 edges between user A an file X, there may be a single line between user A and file X that is thicker than any other edge between another user and file X, indicating the strongest relationship.

In aggregate, the network graph 600 indicates user A has interacted with File A many times, and user B, as well as user C have also interacted with file A. The network graph 600 further indicates that user C has interacted both with file X and application Y. The network graph 600 further indicates that user E has also interacted with application Y.

In various embodiments, the network graph 600 is used to determine participant candidates of an event, such as determining the most likely candidates to attend an upcoming meeting. In some embodiments, for example, participant candidate selection is performed by selecting every person who was invited to a meeting and their N closest connections (e.g., 3 users within a particular distance threshold). For example, using the network graph 600, user A may have been the only user invited to a meeting (not user B, user C, and user E). The network graph 600 may thus represent user A's network graph. One or more network graph rules may specify to select user A's two closest connections, which is user C and user B. In various embodiments, closeness is determined based on using distance in network graphs. In some embodiments, a "distance" in terms of network graphs corresponds to a number of edges (or edge sets) in a shortest path between vertex U and vertex V. In some embodiments, if there are multipole paths connecting two vertices, then the shortest path is considered as the distance between two vertices. Accordingly, distance can be defined as d(U,V). For instance, the distance between user A and file X is 1 (e.g., because there is only 1 edge set G-1 through G-4), the distance between user A and user B (and user C) is 2, whereas the distance between user A and user E is 4 (because there are 4 edge sets between user A and user E). Accordingly, user A's two closest connections are user C and user B. Therefore, user C and user B are selected as participant candidates (but not user E).

In some embodiments, participant candidates are alternatively selected based on distance only regardless of the actual quantity of connections they may be selected (thus not being based on a "N" number of connections, as described above). For example, one or more network graph rules may specify to select all of the vertices or users as participant candidates that are at or within a distance of 4 of user A. In these embodiments, all four users A, B, C, and E would be selected as participant candidates because they are at or within a distance of 4 to user A.

Some embodiments additionally or alternatively select participant candidates by selecting the top N users who interacted the most (e.g., as determined by the number of edges between vertices) with files that are related to an event. For example, if an event is to share file X, one or more network graph rules may specify to select only those users who have two or more edges between them, which in the illustration of FIG. 5, is user A (4 edges) and user B (2 edges) (and not the other users C and E because they only have 1 edge).

In some embodiments, a file or other computer resource that is "related" to an event is one that has been referenced or indicated prior to an event (e.g., as collected by the user-data collection component 210), one that has been shared in other events prior to an event (e.g., a past MICROSOFT TEAMS meeting), and/or one that has been shared (e.g., uploaded) in the event itself. In an illustrative example of these embodiments, a meeting X may be scheduled to start at some future time. Various emails (that discuss the meeting) exchanged prior to the meeting may include a document attachment, which is file X. One or more network graph rules may specify to select those users or vertices in the network graph 600 as participant candidates who have at least one edge connecting themselves to file X. Accordingly, user A, user B, and user C would be selected to be participant candidates because they have at least one edge connecting themselves to file X, whereas user E would not be selected because user E's only edge connection K is with application Y, and not file X. The edge threshold may be any quantity. For example, instead of a rule specifying to selection users who have at least one edge connecting themselves to file X, the rules may specify to select only those users who have at least 3 edges between themselves and file X. In these embodiments, only user A would be selected since it has 4 edges connecting itself with file X, whereas the other users only have 1 edge connecting themselves with file X.

Some embodiments alternatively or additionally select participant candidates by selecting users as participant candidates by selecting N users nearest to the "centroid" of at least a portion of invited users in the network graph 600. A "centroid" in some embodiments refers to the geometric center of a set of objects (e.g., a mean position of the nodes in the network graph 600). For example, if only user B and user E were invited to a meeting (and not user A and user C), the mean position of B and E may be File X. One or more network graph rules may specify to only select users that are within a threshold distance of the centroid—file X. For instance, if the threshold distance was 1, then users C and user A would only be selected because they are within a distance threshold of 1 to file X and user B and user E have already been invited to the meeting. Accordingly, in this example, each user in the network graph 600 would be participant candidates.

Figure 7:
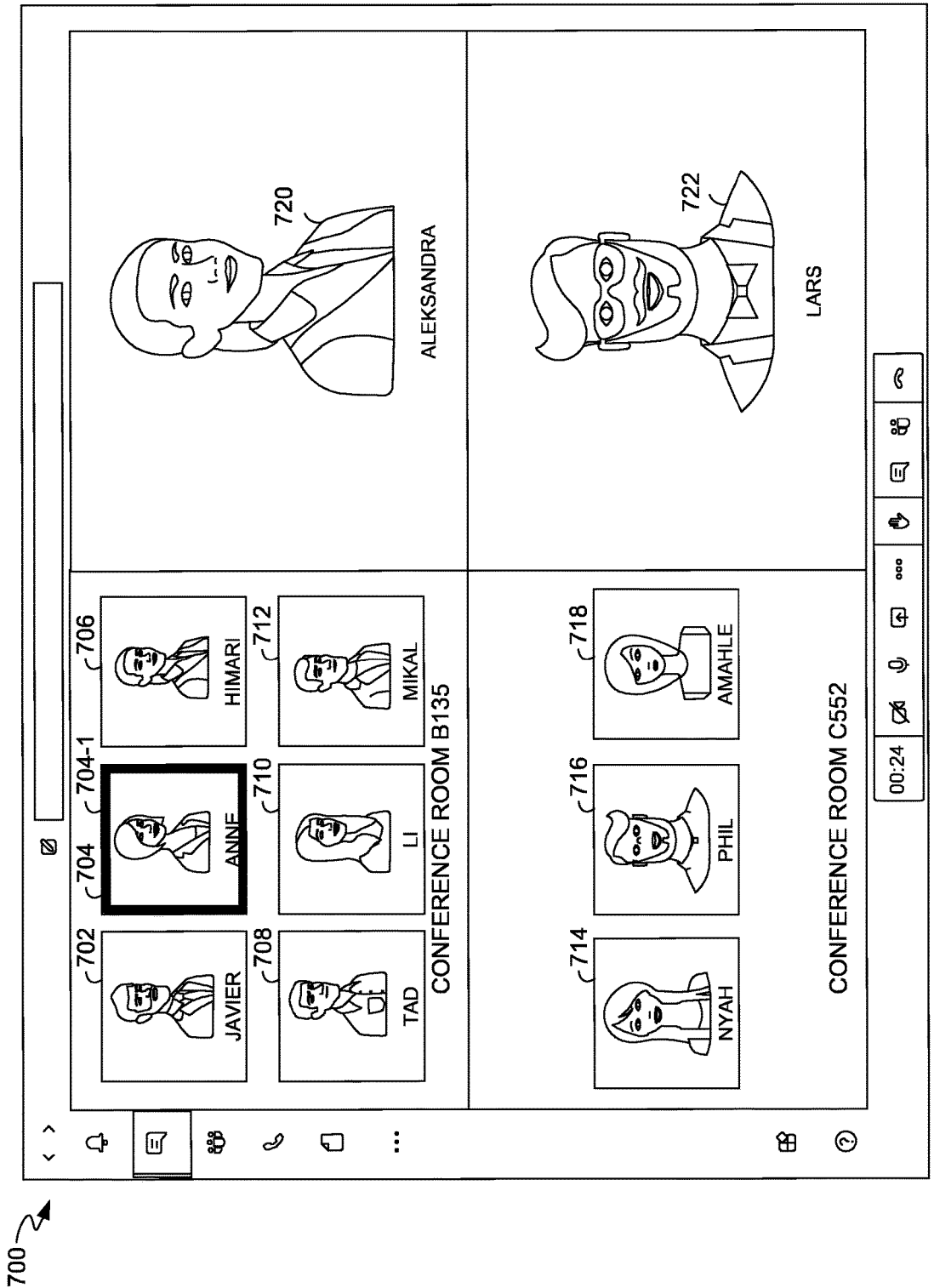
FIG. 7 is an example screenshot illustrating an identity of each user at an event, the quantity of users that use a shared audio source, and a current speaker of a shared audio source, in accordance with embodiments of the present disclosure.

Turning now to FIG. 7, an example screenshot 700 illustrating an identity of each user at an event, the quantity of users that use a shared audio source, and a current speaker of a shared audio source, according to some embodiments. In some embodiments, the screenshot 700 represents the output of the system 200 of FIG. 2 and/or the system 300 of FIG. 3. For example, the indicators 702, 704, 704-1, 706, 708, 710, 712, 714, 716, and/or 718 may represent the indicator(s) 310 of FIG. 3. In some embodiments, the screenshot 700 specifically represents what is caused to be displayed by the presentation component 220 of FIG. 2. In some embodiments, the screenshot 700 is presented within FIG. 10 alternative to the computer display 1020 of scene 1050. In some embodiments, the screenshot 700 represents a page or other instance of a consumer application (e.g., MICROSOFT TEAMS) where users can collaborate and communicate with each other (e.g., via instant chat, video conferencing, and/or the like).

The screenshot 700 illustrates an identity of each user that is participating or a part of an event (i.e., a participant). For example, the screenshot 700 may represent each user that has logged into an application for a virtual meeting. The screenshot 700 specifically illustrates indicators 720 and 722 (Aleksandra and Lars respectively). In some embodiments, indicators 720, 720 or any other indicator described herein represent a portrait (e.g., a profile photo), an avatar, a name, and/or a real-time video frame or snapshot of a user. Each of the participants referenced by the indicators 720 and 722 may only use a single audio source and not a shared audio source. As described herein, some embodiments detect the single audio source. For example, some embodiments can detect (e.g., via the voice recognition model(s)/layer(s) 302) that Aleksandra's voice is the only voice that has been received from Aleksandra's device. Responsive to this detection of Aleksandra's voice, embodiments can cause display of the indicator "Aleksandra" and/or her avatar (and no one else's name or avatar). Alternatively or additionally, some embodiments can receive information (e.g., from the user-data collection component 210) that Aleksandra has been invited to the current meeting and that she will not be a part of a conference room or otherwise will not be sharing a microphone with anyone. Accordingly, Responsive to receiving this information (e.g., prior to the meeting) and receiving an indication that Aleksandra has joined the meeting, embodiments can cause display (e.g., as soon as the meeting begins) of "Aleksandra" and/or her avatar (and no one else's name or avatar).

Some embodiments additionally or alternatively detect a shared audio source associated with the conference room B 135 and C 552. In some embodiments, this detection of the shared audio source is performed by the shared audio source 256 as described with respect to FIG. 2. For example, after the meeting starts, at a first time some embodiments can detect (e.g., via the voice recognition model(s)/layer(s) 302) that Javier 702's voice is the only voice that has been received from Jain's device (e.g., before the meeting begins, invited user Jain (or her ID) can be mapped, via a data structure, to a device ID to determine that Javier's voice has been received from Jain's device). Accordingly, Jain's device is detected to be a shared audio source. Responsive to this detection of Javier's voice, embodiments can cause display of both indicators 602 and 606 corresponding to "Javier" and "Jain" (and none of the other participants "Anne," "Tad," "Li," or "Mikal" at this point) as illustrated in the screenshot 700. Likewise, at a second time subsequent to the first time, some embodiments can detect that Li's voice has also been received from Jain's device. Responsive to this detection of Li's voice, embodiments can cause display of indicator 710 corresponding to "Li" as illustrated in the screenshot 700 (and not "Tad," "Anne," or "Mikal" at this point). At other times subsequent to the second time, this process can be repeated for other participant's voices who have been detected. Accordingly, Tad's, Anne's and Mikal's voice can be detected and their corresponding indicators can be caused to be displayed as illustrated in the screenshot 700.

Alternatively or additionally, some embodiments can receive information (e.g., from the user-data collection component 210) that one or more participants have been invited to the current meeting and that they will be a part of a conference room or otherwise will be sharing a microphone. For example, the shared audio source detector 256 can receive information from the user-data collection component 210 that each of the participants Nyah, Phil, and Amahle will attend the meeting at conference room C552 or will otherwise be sharing an audio source. Accordingly, Responsive to receiving this information (e.g., prior to the event), embodiments can cause display (e.g., as soon as the meeting begins) of indicators 714, 716, and 718 corresponding to "Nyah," "Phil," and "Amahle," (and no one else's name or avatar).

The screenshot 700 additionally illustrates who the current speaker is, as indicated by the indicator 704-1 (i.e., a dark outline bounding box over the indicator 704 relative to other avatars). Accordingly, Anne is the participant who is currently speaking. In some embodiments, this determination of who is currently speaking is performed by the current speaker component 286 as described with respect to FIG. 2. In an illustrative example of how to determine who is currently speaking, embodiments can first detect an utterance. Responsively and in near-real-time (relative to when the utterance is detected), embodiments can run the utterance through a GMM and HMM respectively, which attributes the utterance to Anne. Responsive to this attribution, and in near-real-time (relative to the utterance attribution), embodiments can cause display of the indicator 704-1.

It is understood that although the indicator 704-1 is used to represent who the current speaker is, alternative or additional indicators may be provided. For example, referring back to FIG. 10, virtual assistant 1060 may make a similar statement to 1065 that recites "Anne is currently talking." In some embodiments, this statement may be heard only by the other parties (i.e., parties other than those in the conference room with Anne). Alternatively or additionally, embodiments can superimpose a particular color (e.g., green), a blinking indicator, a text string, highlight, or other indicator over or next to 704 indicating that Anne is currently speaking. For example, referring back to FIG. 10, an indictor (highlighted box 1021) indicates that Naz is currently speaking.

The screenshot 700 additionally illustrates the quantity of people that are using a shared audio source. In some embodiments, the generation of the quantity of people that are using a shared audio source is performed by the speaker count component 290 as descried with respect to FIG. 2. For example, within the conference room B 135, each of the indicators 702, 704, 706, 708, 710, and 712 indicate that there are 6 participants using a shared audio source. Likewise, within the conference room C 552, each of the indicators 714, 716, and 718 indicate that there are 3 participants using another shared audio source. It is understood that there may be other alternative or additional ways to illustrate the quantity of people that are using a shared audio source. For example, there may be a string of text displayed within the conference room B 135 that reads "6 people in conference room." Additionally or alternatively, referring back to FIG. 10, virtual assistant 1060 may make a statement that recites "there are 3 users in conference room C552."

Figure 8:
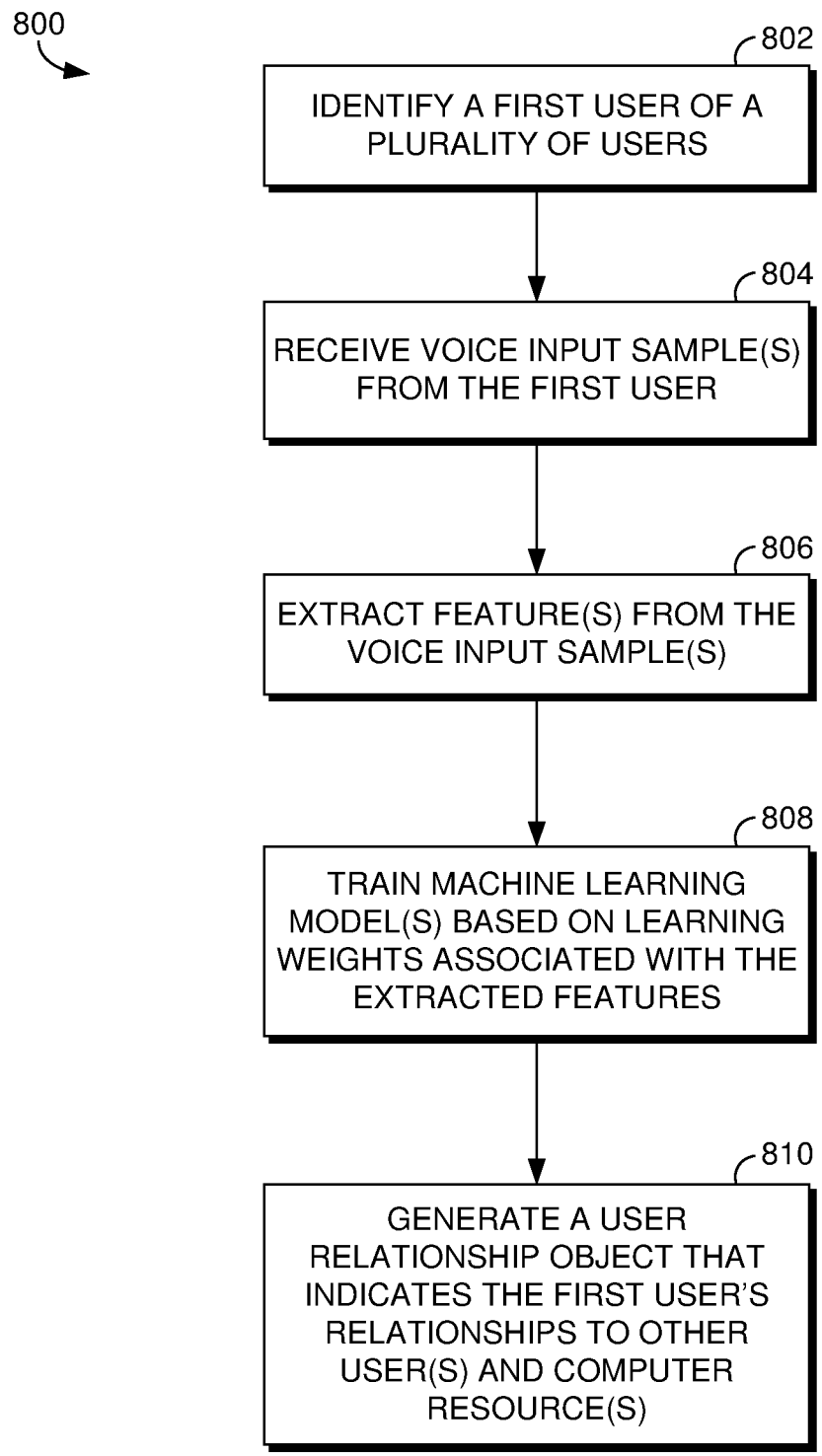
FIG. 8 is a flow diagram of an example process for training one or more machine learning models and generating a user relationship object for a first user, in accordance with embodiments of the present disclosure.

Turning now to FIG. 8, a flow diagram of an example process 800 for training one or more machine learning models and generating a user relationship object for a first user, according to some embodiments. The process 800 (and/or any of the functionality described herein, such as process 900) may be performed by processing logic that comprises hardware (e.g., circuitry, dedicated logic, programmable logic, microcode), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments the process 800 does not include block 810. Any added blocks may include blocks that embody any functionality described herein (e.g., any of the blocks described by the process 900 of FIG. 9) The computer-implemented method, the system (that includes at least one computing device having at least one processor and at least one computer readable storage medium), and/or the computer storage media as described herein may perform or be caused to perform the processes 800 or any other functionality described herein. In some embodiments, the voice learning component 260 as described with respect to FIG. 2 perform blocks 802 through 808 and the user relationship generator 262 as described with respect to FIG. 2 performs block 810.

Per block 802, a first user of a plurality of users are identified. In various embodiments, the plurality of users are associated with an application (e.g., MICROSOFT TEAMS). For example, the plurality of users can be members of a group, business unit, team, company, or organization, which collaborate or communicate with each other via a web application. In some embodiments, the user-data collection component 210 identifies the plurality of users as described with respect to FIG. 2. For example, the user-data collection component 210 can receive one or more user emails indicating which users are members of a group.

Per block 804, embodiments receive one or more voice input samples from the first user. A "voice input sample" as described herein is a recorded or stored voice profile of a user. For example, a voice input sample can be a time window of recorded utterances, which include sounds, phenomes, and the like of the first user at particular frequency, amplitude, and wavelength values. In an illustrative example, voice input samples can be recorded telephone conversations, voice assistant utterances, and/or prior application (e.g., MICROSOFT TEAMS) meeting utterances, as described, for example with respect to the user-data collection component 210, the user profile 240, and/or the voice learning component 260.

Per block 806, particular embodiments extract one or more features from the one or more voice input samples of the first user. For example, some embodiments extract amplitude values, frequency values, and/or wavelength values indicative of loudness (e.g., in dB) and pitch respectively, of one or more voice input samples. In some embodiments, block 804 is performed by the voice learning component 260 as described herein with respect to FIG. 2.

Per block 808, one or more machine learning models are trained based on learning weights associated with the extracted features. In some embodiments the one or more machine learning models correspond to the voice recognition model(s)/layer(s) 302 and/or the voice differentiation model(s) layer(s) 308 of FIG. 3. In some embodiments, the one or more machine learning models correspond to one or more machine learning models described with respect to the voice learning component 260 of FIG. 2. In some embodiments, the one or more machine learning models correspond to the LSTM 400 of FIG. 4.

A "weight" in various instances represents the importance or significant of a feature or feature value for classification or prediction. For example, each feature may be associated with an integer or other real number where the higher the real number, the more significant the feature is for its label or classification. In some embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights proportionately reduce the value of the output. For instance, the more the value of the input increases, the more the value of the output decreases. Negative weights may contribute to negative scores. In many instances, only a selected set of features are primarily responsible for a determination of whether they belong to a particular class or user. In an illustrative example, the first user's voice input sample may include a first amplitude pattern or value. Accordingly, over time, neurons responsible for or assigned to the first amplitude value will weight the corresponding neuron closer to 1, whereas another neuron assigned other much lower amplitude values will have a value closer to 0 (thereby inhibiting the neuron), thereby indicating that the first amplitude value is more indicative of the first user.

In some embodiments, the one or more machine learning models are additionally or alternatively trained by learning an embedding (e.g., the feature space 500 of FIG. 5) of feature vectors based on deep learning to detect similar voice samples in feature space using distance measures, such as cosine distance. In these embodiments, each voice sample is converted from digital sound waves or other forms into a vector (e.g., a set of real numbers) where each value or set of values represents the individual features of the voice input samples in feature space. Feature space (or vector space) is a collection of feature vectors that are each oriented or embedded in space based on an aggregate similarity of features of the feature vector. Over various training stages or epochs, certain feature characteristics for voice input samples can be learned or weighted (as described above).

In various embodiments, weights can be adjusted to indicate the importance of the extracted featured for prediction or classification. In some embodiments, the adjusting includes changing an embedding in feature space of a feature vector representing the voice input sample. For example, after a first round or set of rounds of training, it may be unknown which of the extracted features are important for taking on a certain classification or prediction. Accordingly, each feature may take on equal weight (or close to equal weight within a threshold, such as a 2% changed weight) such that all of the voice input sample feature vectors are substantially close or within a distance threshold in feature space. However, after several rounds of training or any threshold quantity of training, these same voice input sample feature vectors may adjust or change distances from each other based on the feature value similarity. The more features of two voice input sample feature vectors that match or are within a threshold value, the closer the two feature vectors are to each other, whereas when the features do not match or are not within a threshold value, the further away the two feature vectors are from each other. Accordingly, for example, a trained embedding may look similar to the clusters of voice input samples (or utterances) represented in the feature space 500 of FIG. 5.

In various embodiments, the training includes learning an embedding (e.g., a precise coordinate or position) of one or more feature vectors representing the one or more features in feature space (e.g., the feature space 500 of FIG. 5). Learning an embedding may include learning the distance between two or more feature vectors representing two or more voice input samples based on feature similarity of values between the two or more voice input samples and adjusting weights of the deep learning model. For example, as described above, the more that voice input sample features of two voice input samples are matching or are within a threshold feature vector value, the closer the voice input samples (e.g., data points 503-1 and 503-2) are to each other in feature space, whereas when features do not match or are not within a feature vector value threshold, the further away the two feature vectors are from each other in feature space. Accordingly, in response to various training stages, the strength of connection between nodes or neurons of different layers can be weighted higher or strengthened based on the corresponding learned feature values that are most prominent or important for a particular family or classification of a voice input sample (e.g., an indication that the first voice input sample belongs to "John"). In this way, for example, an entire feature space may include an embedding of vectors or other indications that are all learned or embedded in feature spaced based on learning weights corresponding to different voice input sample features such that indications of voice input samples with important features within a threshold distance of each other in feature space are near each other, whereas indications corresponding to dissimilar input samples with features that are not important are not within a threshold distance of each other in the same feature space, are further away.

Some embodiments select when and how to perform the training in block 808. For example, some embodiments learn that the first user is always a part of a conference call or otherwise uses a shared audio source. In response to this learning, embodiments can then activate a recording of the first user's voice anytime the user speaks, such as on calls, in meetings, in smart speakers, and the like. In some embodiments, the one or more machine learning models can be trained based on the detection of background noise. For example, if it is determined that there are multiple speakers speaking at once or that there is other background noise (e.g., pens clicking or chairs moving), embodiments can selectively refrain from using the voice input samples for the time windows where the background noise occurs. Alternatively, these input samples subject to background noise can be weighted lower, as the sound quality is not has high. In some embodiments, the training at block 808 is indicative of incremental training, where training occurs continuously, even when the one or more machine learning models are deployed (as opposed to requiring a training phase to occur before deployment). This helps in situations where, for example, data privacy is an issue and data needs to be discarded on a continual basis. However, if data was periodically discarded in non-incremental training situations, there would eventually be no training data left. Accordingly, some embodiments continually train on user's voice input samples while also discarding other voice input samples, such as old data, which improves computing resource as described herein.

Per block 810, particular embodiments generate a user relationship object that indicates the first user's relationship to other user(s) and computer resource(s). In various embodiments, the user relationship object represents the user relationship object(s) 242 of FIG. 2, the user relationship object(s) 304 of FIG. 3, and/or the user relationship object 600 of FIG. 6. In some embodiments, the user relationship generator 262 generates the user relationship object of block 810. As described herein, the user relationship object may represent any suitable object, such as the network graph 600 of FIG. 6.

In some embodiments, the process 800 includes one or more additional blocks that include detecting an utterance of the first user (e.g., as described with respect to the utterance detector 282), and determine and identity of the first user in response to the detecting of the utterance of the first user based at least in part on the training at block 808 and the generating of the user relationship object at block 810. For example, this is described with respect to FIG. 3 where the participant candidate(s) 306 derived from the user relationship object(s) 304 are used as input into the voice recognition model(s)/layer(s) 302 so that only voice input samples from the participant candidates are compared against the utterance of the first user to attribute the utterance to the first user, as described herein. Some embodiments additionally cause presentation, to a user device, of a first indicator that identifies the first user (e.g., as illustrated in the screenshot 700 of FIG. 7 or the computer screen 1020 of scene 1050.

In some embodiments, this determination of the identity includes using a first model to determine that there are different speakers that share a same audio source and using a second model to assign or attribute the first utterance to the first user. For example, referring back to FIG. 3, the first model may represent the voice differentiation model(s)/layer(s) 308 and the second model may represent the voice recognition model(s)/layer(s).

In some embodiments, the process 800 includes additional blocks of detecting a second utterance from the same audio source (a shared audio source) where the second user is among the plurality of users indicated in block 802. Based at least in part on the detecting of the second utterance from the same audio source and the second user being in the list of participant candidates to an event, certain embodiments determine an identity of the second user that made the second utterance. In response to the determining of the identity of the second participant, certain embodiments cause presentation, to the user device, of a second indicator that identifies the second user. Examples of this are described with respect to the screenshot 700 of FIG. 7. For example, the first user may represent Javier and the second user may represent Mikal. As described herein, "Javier" is caused to be displayed before "Mikal" based on Javier's utterance being detected before Mike s.

In some embodiments, the process 800 includes additional blocks where it is determined that the second user is currently speaking. In response to the determining that the second user is currently speaking, certain embodiments cause presentation, to the user device, of a third indicator indicating that the second user is currently speaking (and there is no indicator indicating that the first user is currently speaking). For example, referring back to FIG. 7, it is determined that Anne is currently speaking and embodiments responsively cause presentation of the indicator 704-1 indicating that Anne 704 is currently speaking (and no other indicator 704-1 is displayed indicating that no one else is currently speaking).

Figure 9:
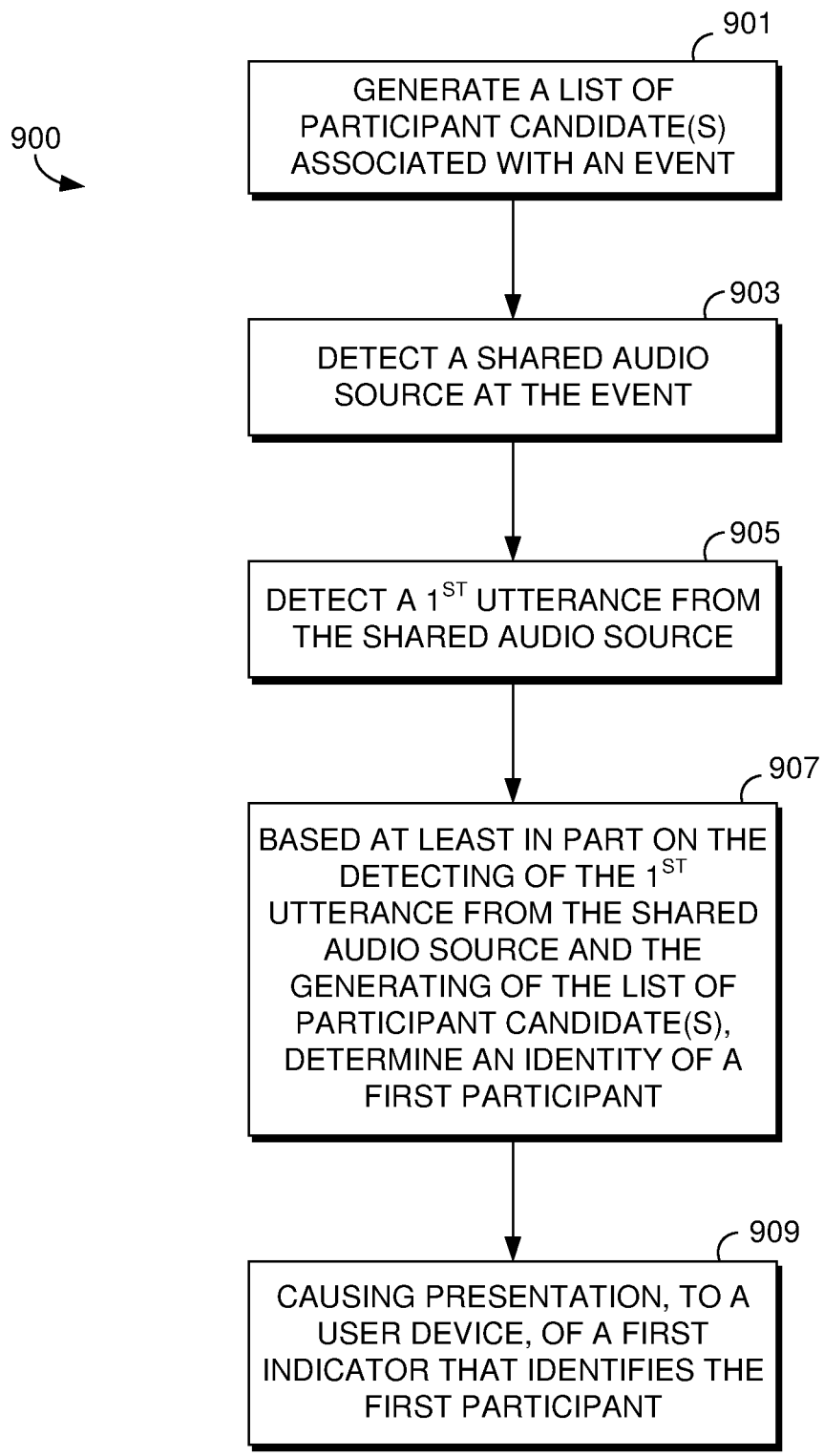
FIG. 9 is a flow diagram of an example process for causing presentation of a first indicator based at least in part on detecting a shared audio source, in accordance with embodiments of the present disclosure.

FIG. 9 is a flow diagram of an example process 900 for causing presentation of a first indicator based at least in part on detecting a shared audio source, according to some embodiments. In some embodiments, the process 900 occurs subsequent to the process 800 of FIG. 8. For example, in response to the generation of the user relationship object at block 810 of FIG. 8, certain embodiments generate a list of participant candidate(s) at block 901, as described herein. In some embodiments, the process 900 is performed by each of the components illustrated and described with respect to FIG. 2.

Per block 901 a list of participant candidate(s) associated with an event is generated. For example, the user-data collection component 210 can receive information that there will likely be 10 participants in a meeting. Accordingly, the user relationship generator 262 can generate the list of participate candidates that indicate the 10 participants. In some embodiments, the list of participant candidates is generated based on generating one or more user relationships objects. For example a user relationship object associated with a first participant may indicate the relationships of the first participant to one or more other users or computer resources and the generating of the participant candidates is based on the generation of the user relationship object. Examples of this are described with reference to the network graph 600 of FIG. 6. Accordingly, for example, the first participant may represent user A and the one or more other users or computer resources may represent users C, B, and/or E and/or file X and application Y. As described with respect to FIG. 6, the participant candidates can be selected based on various methods, such as selectin the N closest users to the first participant (user A). Accordingly, as illustrated in FIG. 6, the one or more user relationship objects can include a first network graph that indicates edges that represent relationships of the first participant to one or more other users or computer resources. And the first participant and the one or more other users and the computer resources are represented by vertices.

Per block 903, a shared audio sources associated with an event (e.g., a meeting) is detected. Examples of this detection are described with respect to the shared audio source detector 256 of FIG. 2. In various embodiments, the shared audio source is indicative of a plurality of participants of the event using (or being assigned to) the same audio source. Additionally or alternatively, the shared audio source may be indicative of at least two different people using a same audio source. The audio source is configured to process sound signals, as described herein. In some embodiments, the detecting of the shared audio source is based at least in part on determining contextual data indicating that the plurality of participants are to share a same audio source. For example, referring back to FIG. 2, the shared audio source detector 256 may receive information from the user-data collection component 210 of an identity of the users that will be in a conference room for an upcoming meeting. Accordingly, the shared audio source detector 256 can infer that a shared audio source will be used by these specific users.

Alternatively or additionally, some embodiments detect a shared audio source at the event based on detecting, in near-real-time, multiple utterances and determining that they are associated with two or more different users that share a same audio source. For example, some embodiments detect a first utterance from an audio source and detect a second utterance from the same audio source. Responsively, certain embodiments determine that the first utterance and the second utterance are associated with two different people (e.g., based at least in part on training a first HMM for the first participant and a second HMM for a second participant). In an illustrative example, a GMM, as described herein with respect to the shared audio source detector 256 can be used to differentiate between utterances or predict that the two utterances were uttered by different users. And based on this determination, in certain embodiments a shared audio source is detected by mapping in a data structure, for example, each different utterance to a same device ID that the utterances came from.

Per block 905, some embodiments detect a first utterance from the shared audio source. For example, as described with respect to the utterance detector 282, certain embodiments can receive an utterance that includes the phrase "let's start the project tomorrow," which is converted to text (e.g., via speech-to-text technologies), after which embodiments can determine, using NLP, that the sound is an utterance.

Per block 907, based at least in part on the detecting of the first utterance from the shared audio source and the generating of the list of participant candidates, particular embodiments determine an identity of a first participant associated with the event. The first participant may be the one that made or uttered the first utterance. In some embodiments, however, the determining of the identity of the first participant need not be based on the generating of the list of participant candidates. It is also understood that in some embodiments, the first participant is not included in the list of participant candidate(s). That is the first participant was never determined to be a participate candidate but their identity was determined from another source of information (e.g., information collected from the user-collection component 210). In some of these embodiments, responsive to determine that the identity of the first participant is not associated with being a participant candidate, embodiments add them to the list of participant candidates at block 907.

In an illustrative example of block 907, prior to the detecting of the first utterance, one or more voice input samples from the first participant is received (e.g., as described with respect to block 804 of FIG. 8). Responsively, one or more features from the one or more voice input samples are extracted (e.g., as described with respect to block 806 of FIG. 8). Responsively, some embodiments train one or more machine learning models to recognize a voice of the first participant based on learning weights associated with the one or more features (e.g., as described with respect to block 808 of FIG. 8). Accordingly, the determining of the identity of the first participant that made the first utterance is based on the training of the one or more machine learning models. For example, as described herein, particular frequency, amplitude, and/or wavelength values (e.g., a feature vector representing the first utterance) may match or be within a threshold distance of another feature vector representing other classes of voice input samples (e.g., as described with respect to FIG. 5) so that the first utterance can be classified or predicted to be associated with a particular user.

And as described with respect to FIG. 3 and elsewhere herein, the inputs to the one or more machine learning models can include the list of participant candidates so that when a prediction is made, only those participant candidates who are on the list are compared against the first utterance. For example, referring back to FIG. 5, only classes 509 and 503 corresponding to a first user and a second user may be identified as participant candidates (whereas the classes 507 and 505 corresponding to other users are not identified as participant candidates). Accordingly, if the first utterance corresponded to the data point 503-2, the distance a Euclidian distance) is only determined between the data point 503-2 and the classes 503 and 509 (or one or more other data points within these classes or a "centroid" data point within these classes) so that embodiments have a higher likelihood or confidence level with regard to predicting the class that the first utterance belongs to.

Per block 909, particular embodiments cause presentation, to a user device, of a first indicator that identifies the first participant. Various embodiments cause presentation of this first indicator based at least in part on the detecting of the shared audio source. For example, the presentation component 220 can cause presentation of the "Javier" indicator corresponding to the indicator 702 next to the "conference room B 135" identifier of the screenshot 700 of FIG. 7, which indicates an identity of a person who is using or has used a shared audio source. In some embodiments, the first indicator that identifies the first participant (and/or a second indicator that identifies a second participant) is rendered via a video conferencing consumer application. For example, FIG. 7 may represent a page or instance of a video conferencing consumer application (e.g., MICROSOFT TEAMS) where: the avatars represent near-real-time videos of users, users can use audio sources to listen to and speak to each other, can chat via natural language text string input, upload computer resources, and/or the like.

In some embodiments, the process 900 includes additional blocks that include the following functionality. Some embodiments detect a second utterance from the shared audio source (e.g., via the utterance detector 282). Based at least in part on the detecting of the second utterance from the shared audio source and the generating of the list of participant candidates, some embodiments determine an identity of a second participant that made the second utterance (e.g., via the user identity determiner 280). And in response to the determining of the identity of the second participant, certain embodiments cause presentation, to the user device, of a second indicator that identifies the second participant. For example, referring back to FIG. 7, the first participant may represent "Javier" and the second participant may represent "Tad." Accordingly, the first indicator may correspond to indicator 702 (or the word "Javier") and the second indicator may correspond to the indicator 708 (or the word "Tad").

Some embodiments determine that the second participant is currently speaking (e.g., as described with respect to the current speaker component 284). And in response to the determining that the second participant is currently speaking, embodiments cause presentation, to the user device, of a third indicator indicating that the second participant is currently speaking (wherein there is no indicator indicating that the first participant is currently speaking). For example, using the illustration above, the indicator 704-1, which the screenshot 700 illustrates is over the indicator 704 or "Anne," can alternatively be placed over the indicator 702 or "Javier," since Javier is the second participant in the example above (and not placed over "Tad"). In another example, embodiments can store, in computer memory, the identity of each user who has spoken since a beginning of the event and their timestamp of their utterance beginning and/or ending point to create a list or other data structure of at least a portion identified participants who use a shared audio source and have spoken up until a current time. Embodiments can responsively use this information to automatically generate portraits or other indicators for at least a portion identified users who share the same audio source, as well as a visual cue whenever any of them is speaking, as illustrated by the indicator 704-1 in FIG. 7, for example.

Some embodiments determine a quantity of participants included in the plurality of participants (e.g., as described herein with respect to the speaker count component 290). In response to the determining of the quantity, particular embodiments cause presentation, to the user device, of an indication of the quantity of participants included in the plurality of participants. Examples of this are described with respect to FIG. 7. For example, the indicators 702, 704, 706, 708, 710, and 712 are illustrated as being within the conference room B 135, which indicates that there are 6 participants in this conference room.

Some embodiments additionally or alternatively detect a third utterance (e.g., via the utterance detector 282) from another audio source. Responsively, some embodiments determine (e.g., via the shared audio source detector 256) that this other audio source is not a particular shared audio source. In response to the determining that this other audio source is not a particular shared audio source, particular embodiments map (e.g., via a data structure) this other audio source to an identity of another participant of the event. Based on this mapping, particular embodiments cause presentation, to the user device, of another indicator that identifies this other participant of the event. Examples of these embodiments are described with respect to FIG. 7. For example, as described with respect to FIG. 7, both indicators 720 and 722 (corresponding to "Aleksandra" and "Lars" respectively) can be mapped to a single audio source and their respective indicators can be caused to be presented to the screenshot 700 as described with respect to FIG. 7.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

Figure 11:
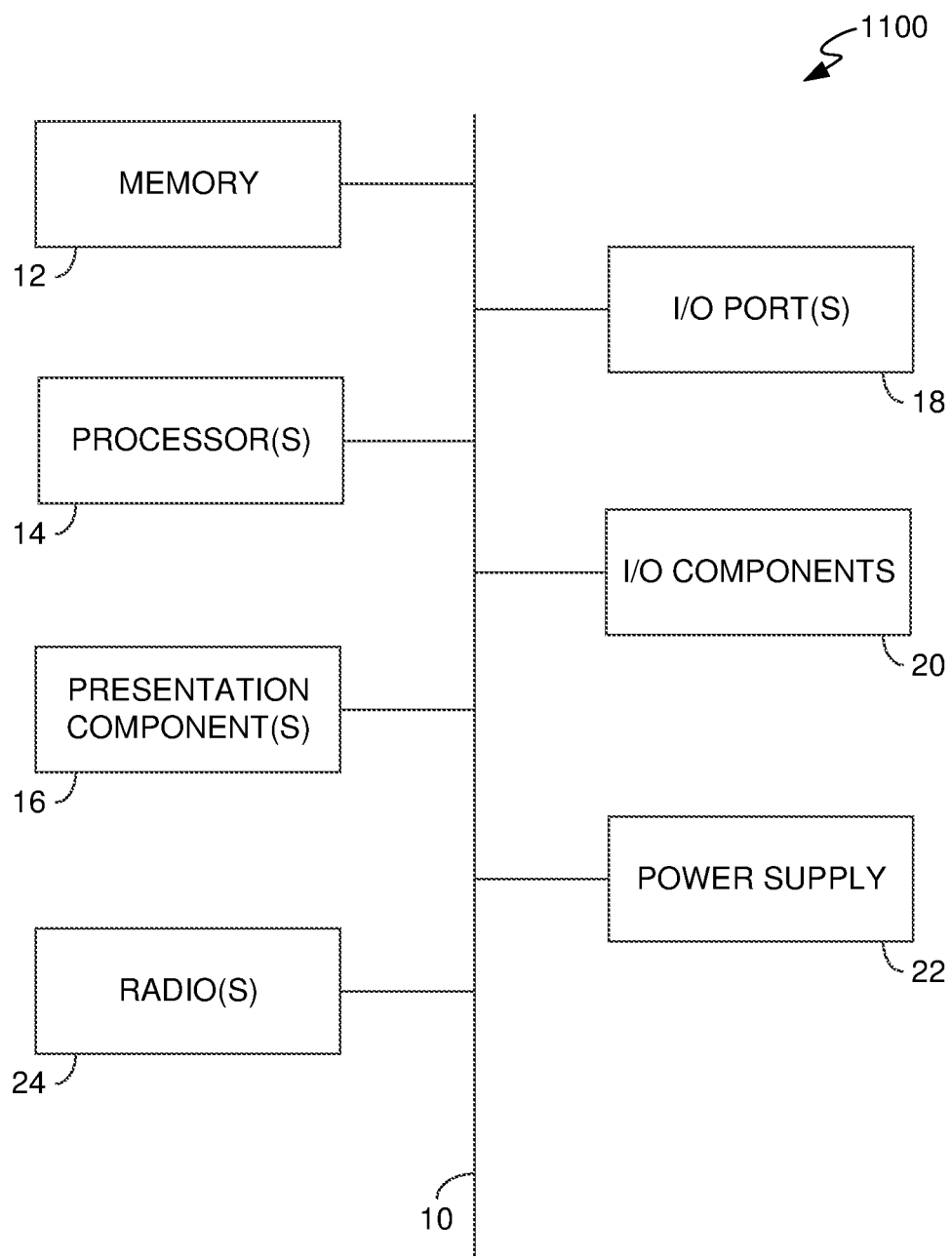
FIG. 11 is a block diagram of an exemplary computing device for use in implementing embodiments of the present disclosure.

With reference to FIG. 11, computing device 1000 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 11 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 11 is merely illustrative of an exemplary computing device that can be used in connection with one or more embodiments of the present disclosure. Distinction is not made between such categories as "workstation," "server," "laptop," "handheld device," etc., as each are contemplated within the scope of FIG. 11 and with reference to "computing device."

Computing device 1100 typically includes a variety of computer-readable media. Computer-readable media can be any available media that can be accessed by computing device 1100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1100. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 1100 includes one or more processors 14 that read data from various entities such as memory 12 or I/O components 20. Presentation component(s) 16 presents data indications to a user or other device. In some implementations presentation component 220 of system 200 may be embodied as a presentation component 16. Other examples of presentation components may include a display device, speaker, printing component, vibrating component, and the like.

The I/O ports 18 allow computing device 1100 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1100. The computing device 1100 may be equipped with depth cameras, such as stereoscopic camera systems, infrared camera systems, RGB camera systems, and combinations of these, for gesture detection and recognition. Additionally, the computing device 1100 may be equipped with accelerometers or gyroscopes that enable detection of motion. The output of the accelerometers or gyroscopes may be provided to the display of the computing device 1100 to render immersive augmented reality or virtual reality.

Some embodiments of computing device 1100 may include one or more radio(s) 24 (or similar wireless communication components). The radio 24 transmits and receives radio or wireless communications. The computing device 1100 may be a wireless terminal adapted to receive communications and media over various wireless networks. Computing device 1100 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

Clause 1 A computerized system comprising: one or more processors; and computer storage memory having computer-executable instructions stored thereon which, when executed by the one or more processors, implement a method comprising: generating a list of participant candidates associated with an event; detecting a shared audio source associated with the event, the shared audio source is indicative of a plurality of participants of the event using a same audio source, wherein the audio source is configured to process sound signals; detecting a first utterance from the shared audio source; based at least in part on the detecting of the first utterance from the shared audio source and the generating of the list of participant candidates, determining an identity of a first participant that made the first utterance, the first participant being included in the plurality of participants that share the same audio source; and causing presentation, to a user device, of a first indicator that identifies the first participant.

Clause 2. The system of clause 1, the method further comprising: detecting a second utterance from the shared audio source; based at least in part on the detecting of the second utterance from the shared audio source and the generating of the list of participant candidates, determining an identity of a second participant that made the second utterance, the second participant being included in the plurality of participants that share the same audio source; and in response to the determining of the identity of the second participant, causing presentation, to the user device, of a second indicator that identifies the second participant.

Clause 3. The system of clause 2, the method further comprising: determining that the second participant is currently speaking; and in response to the determining that the second participant is currently speaking, causing presentation, to the user device, of a third indicator indicating that the second participant is currently speaking, wherein there is no indicator indicating that the first participant is currently speaking.

Clause 4. The system of clause 1, the method further comprising: determining a quantity of participants included in the plurality of participants; and in response to the determining of the quantity, causing presentation, to the user device, of an indication of the quantity of participants included in the plurality of participants.

Clause 5. The system of clause 1, the method further comprising: receiving, prior to the detecting of the first utterance, one or more voice input samples from the first participant; extracting one or more features from the one or more voice input samples; training one or more machine learning models to recognize a voice of the first participant based on learning weights associated with the one or more features, wherein the determining the identity of a first participant that made the first utterance is further based on the training of the one or more machine learning models.

Clause 6. The system of clause 1, the method further comprising: generating a user relationship object associated with the first participant, the user relationship object indicates relationships of the first participant to one or more other users or computer resources, wherein the generating of the participant candidates is based on the generating of the user relationship object.

Clause 7. The system of clause 1, wherein the detecting of the shared audio source is based at least in part on determining contextual data indicating that the plurality of participants are to share a same audio source.

Clause 8. A computer-implemented method comprising: detecting a first utterance from an audio source; detecting a second utterance from the audio source; determining that the first utterance and the second utterance are associated with two different users; based at least in part on the determining, detecting a shared audio source, the shared audio source is indicative of at least the two different users sharing a same audio source, wherein the audio source is configured to process sound signals; and based at least in part on the detecting of the shared audio source, causing presentation, to a user device, of a first indicator that identifies a first user and a second indicator that identifies a second user.

Clause 9. The method of clause 8, further comprising: detecting a third utterance from another audio source; determining that the another audio source is not a particular shared audio source; in response to the determining that the another audio source is not a particular shared audio source, mapping the another audio source to an identity of another participant of the event; and based on the mapping, causing presentation, to the user device, of another indicator that identifies the another participant of the event.

Clause 10. The method of clause 9, the method further comprising: determining that the second participant is currently speaking; and in response to the determining that the second participant is currently speaking, causing presentation, to the user device, of a third indicator indicating that the second participant is currently speaking, wherein there is no indicator indicating that the first participant or the another participant is currently speaking.

Clause 11. The method of clause 8, further comprising: determining a quantity of participants associated with the shared audio source; and in response to the determining of the quantity, causing presentation, to the user device, of an indication of the quantity of participants associated with the shared audio source.

Clause 12. The method of clause 8, wherein the determining that the first utterance and the second utterance are associated with two different people is based at least in part on training a first Hidden Markov Model (HMM) for the first participant and training a second HMM for the second participant.

Clause 13. The method of clause 8, further comprising: generating a first network graph associated with the first participant, the first network graph indicates edges that represent relationships of the first participant to one or more other users or computer resources, wherein the first participant and the one or more other users and the computer resources are represented by vertices.

Clause 14. The method of clause 8, wherein the first indicator that identifies the first participant and the second indicator that identifies the second participant are rendered via a video conferencing consumer application.

Clause 15. One or more computer storage media having computer-executable instructions embodied thereon that, when executed, by one or more processors, cause the one or more processors to perform a method, the method comprising: identify a first user of a plurality of users associated with an application; receive one or more voice input samples from the first user; extract one or more features from the one or more voice input samples; train one or more machine learning models based on learning weights associated with the one or more features; generate a user relationship object associated with the first user, the user relationship object indicates the first user's relationships to one or more other users or computer resources; detect an utterance of the first user; based at least in part on the training of the one or more machine learning models and the generating of the user relationship object, determine an identity of the first user in response to the detecting of the utterance of the first user, the first user being included in a plurality of users that share the same audio source; and based at least in part on the determining of the identity, cause presentation, to a user device, of a first indicator that identifies the first user.

Clause 16. The computer storage media of clause 15, the method further comprising: detecting a second utterance from the same audio source; based at least in part on the detecting of the second utterance from the same audio source and a second user being in a list of participant candidates to an event, determining an identity of the second user that made the second utterance; and in response to the determining of the identity of the second participant, causing presentation, to the user device, of a second indicator that identifies the second user.

Clause 17. The computer storage media of clause 16, the method further comprising: determining that the second user is currently speaking; and in response to the determining that the second user is currently speaking, causing presentation, to the user device, of a third indicator indicating that the second user is currently speaking, wherein there is no indicator indicating that the first user is currently speaking.

Clause 18. The computer storage media of clause 15, wherein the determining an identity of the first user includes using a first model to determine that there are different speakers that share the same audio source and using a second model to assign the first utterance to the first user, wherein the second model represents the one or more machine learning models.

Clause 19. The computer storage media of clause 15, wherein the user relationship object represents a network graph.

Clause 20. The computer storage media of clause 15, the method further comprising detecting the shared audio source based at least in part on determining contextual data indicating that the plurality of participants are to share a same audio source and determining that the utterance from the first user and another utterance emanating from the shared audio source are from two different people.

What is claimed is:

1. A computerized system comprising:
   one or more processors; and
   computer storage memory having computer-executable instructions stored thereon which, when executed by the one or more processors, implement a method comprising:
   generating a list of participant candidates associated with an event;
   detecting a shared audio source associated with the event, the shared audio source is indicative of a plurality of participants of the event using a same audio source, wherein the audio source is configured to process sound signals;
   detecting a first utterance from the shared audio source;
   based at least in part on the detecting of the first utterance from the shared audio source and the generating of the list of participant candidates, determining an identity of a first participant that made the first utterance, the first participant being included in the plurality of participants that share the same audio source; and
   causing presentation, to a user device, of a first indicator that identifies the first participant,
   wherein the determining the identity of the first participant that made the first utterance is further based on generation of a user relationship object indicating the first participant's relationships to others of the plurality of participants.

2. The system of claim 1, wherein the memory has computer-executable instructions stored thereon which, when executed by the one or more processors, further implement the method comprising:
   detecting a second utterance from the shared audio source;
   based at least in part on the detecting of the second utterance from the shared audio source and the generating of the list of participant candidates, determining an identity of a second participant that made the second utterance, the second participant being included in the plurality of participants that share the same audio source; and
   in response to the determining of the identity of the second participant, causing presentation, to the user device, of a second indicator that identifies the second participant.

3. The system of claim 2, wherein the memory has computer-executable instructions stored thereon which, when executed by the one or more processors, further implement the method comprising:
   determining that the second participant is currently speaking; and
   in response to the determining that the second participant is currently speaking, causing presentation, to the user device, of a third indicator indicating that the second participant is currently speaking, wherein there is no indicator indicating that the first participant is currently speaking.

4. The system of claim 1, wherein the memory has computer-executable instructions stored thereon which, when executed by the one or more processors, further implement the method comprising:
   determining a quantity of participants included in the plurality of participants; and
   in response to the determining of the quantity, causing presentation, to the user device, of an indication of the quantity of participants included in the plurality of participants,
   wherein the user relationship object is generated based on mentions of one or more of the plurality of participants in at least one of an email, a text, a social media post, and a meeting application.

5. The system of claim 1, wherein the memory has computer-executable instructions stored thereon which, when executed by the one or more processors, further implement the method comprising:
   receiving, prior to the detecting of the first utterance, one or more voice input samples from the first participant;
   extracting one or more features from the one or more voice input samples; and
   training one or more machine learning models to recognize a voice of the first participant based on learning weights associated with the one or more features, wherein the determining the identity of the first participant that made the first utterance is further based on the training of the one or more machine learning models.

6. The system of claim 1, wherein the memory has computer-executable instructions stored thereon which, when executed by the one or more processors, further implement the method comprising:
   generating a user relationship object associated with the first participant, the user relationship object indicates relationships of the first participant to one or more other users or computer resources, wherein the generating of the participant candidates is based on the generating of the user relationship object.

7. The system of claim 1, wherein the detecting of the shared audio source is based at least in part on determining contextual data indicating that the plurality of participants are to share a same audio source.

8. A computer-implemented method comprising:
detecting a first utterance from an audio source;
detecting a second utterance from the audio source;
determining that the first utterance and the second utterance are associated with two different users among a plurality of participants in a event;
based at least in part on the determining, detecting a shared audio source, the shared audio source is indicative of at least the two different users sharing a same audio source, wherein the audio source is configured to process sound signals;
based at least in part on the detecting of the shared audio source, causing presentation, to a user device, of a first indicator that identifies a first participant among the plurality of participants and a second indicator that identifies a second participant among the plurality of participants; and
determining that the first utterance is associated the first participant based on generation of a user relationship object indicating the first participant's relationships to others of the plurality of participants.

9. The method of claim 8, further comprising:
detecting a third utterance from another audio source;
determining that the another audio source is not a particular shared audio source;
in response to the determining that the another audio source is not a particular shared audio source, mapping the another audio source to an identity of another participant of an event; and
based on the mapping, causing presentation, to the user device, of another indicator that identifies the another participant of the event.

10. The method of claim 9, further comprising:
determining that the second participant is currently speaking; and
in response to the determining that the second participant is currently speaking, causing presentation, to the user device, of a third indicator indicating that the second participant is currently speaking, wherein there is no indicator indicating that the first participant or the another participant is currently speaking.

11. The method of claim 8, further comprising:
determining a quantity of participants associated with the shared audio source; and
in response to the determining of the quantity, causing presentation, to the user device, of an indication of the quantity of participants associated with the shared audio source,
wherein the user relationship object is generated based on mentions of one or more of the plurality of participants in at least one of an email, a text, a social media post, and a meeting application.

12. The method of claim 8, wherein the determining that the first utterance and the second utterance are associated with two different people is based at least in part on training a first Hidden Markov Model (HMM) for the first participant and training a second HMI for the second participant.

13. The method of claim 8, further comprising:
generating a first network graph associated with the first participant, the first network graph indicates edges that represent relationships of the first participant to one or more other users or computer resources,
wherein the first participant and the one or more other users and the computer resources are represented by vertices.

14. The method of claim 8, wherein the first indicator that identifies the first participant and the second indicator that identifies the second participant are rendered via a video conferencing consumer application.

15. One or more computer storage media having computer-executable instructions embodied thereon that, when executed, by one or more processors, cause the one or more processors to perform a method comprising:
identify a first user of a plurality of users associated with an application;
receive one or more voice input samples from the first user;
extract one or more features from the one or more voice input samples;
train one or more machine learning models based on learning weights associated with the one or more features;
generate a user relationship object associated with the first user, the user relationship object indicates the first user's relationships to one or more other users or computer resources;
detect an utterance of the first user;
based at least in part on the training of the one or more machine learning models and the generating of the user relationship object, determine an identity of the first user in response to the detecting of the utterance of the first user, the first user being included in a plurality of users that share the same audio source; and
based at least in part on the determining of the identity, cause presentation, to a user device, of a first indicator that identifies the first user.

16. The computer storage media of claim 15, wherein the computer-executable instructions embodied thereon that, when executed, by the one or more processors, cause the one or more processors to further perform the method comprising:
detecting a second utterance from the same audio source;
based at least in part on the detecting of the second utterance from the same audio source and a second user being in a list of participant candidates to an event, determining an identity of the second user that made the second utterance; and
in response to the determining of the identity of the second participant, causing presentation, to the user device, of a second indicator that identifies the second user.

17. The computer storage media of claim 16, wherein the computer-executable instructions embodied thereon that, when executed, by the one or more processors, cause the one or more processors to further perform the method comprising:
determining that the second user is currently speaking; and
in response to the determining that the second user is currently speaking, causing presentation, to the user device, of a third indicator indicating that the second user is currently speaking, wherein there is no indicator indicating that the first user is currently speaking.

18. The computer storage media of claim 15, wherein the determining the identity of the first user includes using a first model to determine that there are different speakers that share the same audio source and using a second model to assign the first utterance to the first user, wherein the second model represents the one or more machine learning models.

19. The computer storage media of claim 15, wherein the user relationship object represents a network graph.

20. The computer storage media of claim 15, wherein the computer-executable instructions embodied thereon that, when executed, by the one or more processors, cause the one or more processors to further perform the method detecting the shared audio source based at least in part on determining contextual data indicating that a plurality of participants are to share a same audio source and determining that the utterance from the first user and another utterance emanating from the shared audio source are from two different people.

* * * * *